(12) United States Patent
Matsuki et al.

(10) Patent No.: US 12,028,892 B2
(45) Date of Patent: Jul. 2, 2024

(54) FLYING DEVICE, CONTROL DEVICE, COMMUNICATION CONTROL METHOD, AND CONTROL METHOD

(71) Applicant: KDDI CORPORATION, Tokyo (JP)

(72) Inventors: Tomoaki Matsuki, Tokyo (JP); Masafumi Hirono, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 131 days.

(21) Appl. No.: 17/515,665

(22) Filed: Nov. 1, 2021

(65) Prior Publication Data

US 2022/0053506 A1 Feb. 17, 2022

Related U.S. Application Data

(62) Division of application No. 16/466,247, filed as application No. PCT/JP2017/043551 on Dec. 5, 2017, now Pat. No. 11,212,816.

(30) Foreign Application Priority Data

Dec. 5, 2016 (JP) .................. 2016-236239
Dec. 5, 2016 (JP) .................. 2016-236240

(Continued)

(51) Int. Cl.
*H04W 72/10* (2009.01)
*B64C 39/02* (2023.01)
(Continued)

(52) U.S. Cl.
CPC ........... *H04W 72/56* (2023.01); *B64C 39/024* (2013.01); *G05D 1/0022* (2013.01);
(Continued)

(58) Field of Classification Search
CPC ... H04W 72/56; H04W 72/51; H04W 72/542; B64C 39/024; G05D 1/0022;
(Continued)

(56) References Cited

U.S. PATENT DOCUMENTS

2012/0046060 A1 2/2012 Katayama
2014/0213251 A1* 7/2014 Hasegawa ......... H04W 52/0277
455/435.1
(Continued)

FOREIGN PATENT DOCUMENTS

CN 104243132 A 12/2014
CN 104581783 A 4/2015
(Continued)

OTHER PUBLICATIONS

International Search Report with English translation and Written Opinion issued in corresponding Application No. PCT/JP2017/043551 dated Feb. 27, 2018.
(Continued)

*Primary Examiner* — James T Boylan
(74) *Attorney, Agent, or Firm* — Foley & Lardner LLP

(57) ABSTRACT

A flying device that flies by being controlled from an external location, the flying device including a determination unit that determines a communication quality on a first wireless communication channel used for transmitting data to a control device that controls the flying device within a prescribed range from a flight position at which the flying device is flying; and a transmission control unit that controls a type of data to be transmitted to the control device on the basis of the communication quality determined by the determination unit.

20 Claims, 22 Drawing Sheets

(30) Foreign Application Priority Data

Dec. 5, 2016 (JP) ................................ 2016-236241
Dec. 9, 2016 (JP) ................................ 2016-239227

(51) Int. Cl.

| | | |
|---|---|---|
| G05D 1/00 | (2006.01) | |
| G08C 17/02 | (2006.01) | |
| H04N 7/18 | (2006.01) | |
| H04W 72/12 | (2023.01) | |
| H04W 72/51 | (2023.01) | |
| H04W 72/542 | (2023.01) | |
| H04W 72/56 | (2023.01) | |
| B64U 10/13 | (2023.01) | |

(52) U.S. Cl.

CPC ........... *G05D 1/0038* (2013.01); *G05D 1/005* (2013.01); *G08C 17/02* (2013.01); *H04N 7/18* (2013.01); *H04W 72/51* (2023.01); *H04W 72/542* (2023.01); *B64U 10/13* (2023.01); *B64U 2201/20* (2023.01); *G08C 2201/91* (2013.01)

(58) Field of Classification Search

CPC .... G05D 1/005; G08C 17/02; G08C 2201/91; H04N 7/18; B64U 10/13; B64U 2201/20

See application file for complete search history.

(56) References Cited

U.S. PATENT DOCUMENTS

| | | |
|---|---|---|
| 2015/0304885 A1 | 10/2015 | Jalali |
| 2016/0132052 A1 | 5/2016 | Seydoux et al. |
| 2016/0371985 A1 | 12/2016 | Kotecha |
| 2016/0371987 A1* | 12/2016 | Kotecha ............... G05D 1/0022 |
| 2017/0041587 A1 | 2/2017 | Wei |
| 2017/0148328 A1 | 5/2017 | Chan |
| 2018/0129212 A1 | 5/2018 | Lee |
| 2018/0242191 A1 | 8/2018 | Lundqvist |
| 2018/0359749 A1* | 12/2018 | Liu ....................... H04L 5/0091 |
| 2019/0364451 A1 | 11/2019 | Yang |

FOREIGN PATENT DOCUMENTS

| | | |
|---|---|---|
| CN | 105208315 A | 12/2015 |
| CN | 105721862 A | 6/2016 |
| CN | 205377847 U | 7/2016 |
| CN | 105818961 A | 8/2016 |
| CN | 105979264 A | 9/2016 |
| CN | 105979603 A | 9/2016 |
| CN | 106056875 A | 10/2016 |
| JP | A-2009-246670 | 10/2009 |
| JP | A-2010-246043 | 10/2010 |
| JP | 2012209744 | 10/2012 |
| JP | A-2012-209744 | 10/2012 |
| JP | A-2013-021540 | 1/2013 |
| JP | A-2013-128287 | 6/2013 |
| JP | A-2015-123793 | 7/2015 |
| JP | A-2016-174360 | 9/2016 |
| WO | WO 2016/121676 A1 | 8/2016 |

OTHER PUBLICATIONS

Office Action with English translation issued in corresponding Japanese Application No. 2016-239227 dated Nov. 20, 2018.
Office Action issued in corresponding Japanese Patent Application No. 2016-239227 dated Jun. 25, 2019 with English translation.
Office Action issued in corresponding Chinese Patent Application No. 201780074930.3 dated Apr. 26, 2021, with English translation.

* cited by examiner

FLYING DEVICE, CONTROL DEVICE, COMMUNICATION CONTROL METHOD, AND CONTROL METHOD

TECHNICAL FIELD

The present invention relates to a flying device, a control device, a communication control method, and a control method.

The present application is a divisional of U.S. patent application Ser. No. 16/466,247, filed on Jun. 3, 2019, which is a 371 of PCT/JP2017/043551, dated Dec. 5, 2017, which is based upon and claims the benefit of priority from Japanese Patent Application No. 2016-236239, Japanese Patent Application No. 2016-236240 and Japanese Patent Application No. 2016-236241, all filed Dec. 5, 2016, and Japanese Patent Application No. 2016-239227, filed Dec. 9, 2016, the contents of all of the above applications are incorporated herein by reference.

BACKGROUND ART

In recent years, drones, which are flying devices that can be remotely controlled, have come into widespread use. Patent Document 1 discloses a technology in which images of the environs are captured by a camera mounted on a flying device, and data of the captured images are transmitted to a terminal used by a user to operate the flying device. Additionally, Patent Document 1 discloses a technology for transmitting, from the terminal used to operate the flying device to the flying device, via a wireless channel, data for controlling the flying device.

CITATION LIST

Patent Literature

[Patent Document 1]
 Japanese Unexamined Patent Application, First Publication No. 2016-174360

SUMMARY OF INVENTION

Problem to be Solved by the Invention

In conventional systems, image data that has been captured by a camera and control data for controlling a flying device are transmitted to a user terminal via a wireless communication channel. When a flying device transmits image data and control data in this way, if the radio signal conditions become worse and the effective transmission rate becomes lower, then much of the transmission band is used to transmit the image data, which includes a large amount of data. As a result thereof, there are cases in which the transmission of control data is delayed. If the transmission of control data is delayed, it becomes difficult to quickly control a flying device in response to the state thereof, and there were problems in which the flying performance of the flying device was lowered.

The present invention was made in consideration of these problems, and an objective of the invention is to provide a flying device, a control device, a communication control method and a control method that reduce transmission delays of data transmit and received between the flying device and the control device.

Means for Solving the Problem

A flying device according to a first embodiment of the present invention is a flying device that flies by being controlled from an external location, comprising a determination unit configured to determine a communication quality on a first wireless communication channel used for transmitting data to a control device that controls the flying device within a prescribed range from a flight position at which the flying device is flying; and a transmission control unit configured to control a type of data to be transmitted to the control device on the basis of the communication quality determined by the determination unit. The determination unit may determine the communication quality at a predicted position, within the prescribed range, at which flight is predicted.

The flying device may further comprise an acquisition unit configured to acquire radio signal state information indicating a radio signal strength distribution on the first wireless communication channel used for the data transmission; and the determination unit may determine the communication quality corresponding to the predicted position on the basis of the radio signal state information.

The determination unit may determine the predicted position on the basis of the flight position and a flight direction indicated by control information received from the control device. The determination unit may determine the predicted position after a prescribed time period has elapsed, further on the basis of a flight speed of the flying device.

The flying device may further comprise a data generation unit configured to generate captured image data of a vicinity of the flight position and text data including flight information regarding the flying device; and when the communication quality determined by the determination unit is a threshold value or higher, the transmission control unit may transmit the captured image data and the text data including information regarding the flying device to a control device that controls the flying device, and when the communication quality determined by the determination unit is less than the threshold value, the transmission control unit may transmit the text data to the control device without transmitting the captured image data to the control device.

When the communication quality determined by the determination unit is less than a threshold value, the transmission control unit may transmit, to the control device, report information indicating that the communication quality has become lower.

The flying device may further comprise a storage unit configured to collect the data to be transmitted to the control device after the transmission control unit transmits the report information to the control device and until an instruction to switch from the first wireless communication channel to a second wireless communication channel is received from the control device; and after receiving the instruction, from the control device, to switch to the second wireless communication channel, the transmission control unit may transmit the data collected in the storage unit to the control device, via the second wireless communication channel.

The transmission control unit may transmit, to the control device, report information indicating that the communication quality has become lower, on the condition that a second radio signal strength on the second wireless communication channel is greater than a first radio signal strength at the predicted position within the prescribed range at which flight is predicted, determined on the basis of the first radio signal state information indicating a first radio signal strength distribution on the first wireless communication channel.

The first wireless communication channel may be used when transmitting the data to the control device via a base station in a mobile telephone network, and the second wireless communication channel may be used when transmitting the data to the control device without being mediated by the base station.

The flying device may further comprise a text data generation unit configured to generate text data relating to a state of the flying device during flight; and an image data generation unit configured to capture images of a vicinity of the flight position and generates captured image data; and the transmission control unit may prioritize transmission of the text data to the control device for controlling the flying device over transmission of the captured image data.

The transmission control unit may make a time period during which a retransmission process is continued when transmitting the text data longer than the time period during which retransmission is continued when transmitting the captured image data.

The transmission control unit may reduce an amount of the captured image data transmitted during a prescribed time period before a timing at which the text data is transmitted.

Additionally, the transmission control unit may stop transmitting the captured image data while transmitting the text data. The transmission control unit may stop transmitting the captured image data during a prescribed time period before a timing at which transmission of the text data is started.

The transmission control unit may prioritize transmission of the text data to the control device for controlling the flying device over transmission of the captured image data on the condition that the communication quality has become lower to a prescribed threshold value or less.

The flying device may further comprise a position detection unit configured to detect the flight position; and the transmission control unit may prioritize transmission of the text data to the control device for controlling the flying device over transmission of the captured image data on the condition that the flight position detected by the position detection unit is included in a prescribed area.

The prescribed area may be an area in which a required level of flight safety is higher than that in other areas.

The transmission control unit may transmit the text data using a wireless communication channel in which a propagation delay time is shorter among a first wireless communication channel that is used when transmitting the data to the control device via a base station of a mobile telephone network and a second wireless communication channel that is used when transmitting the data to the control device without being mediated by the base station, and may transmit the captured image data using a wireless communication channel in which the propagation delay time is longer among the first wireless communication channel and the second wireless communication channel.

The transmission control unit may transmit the text data using radio signals of which strength is high among first radio signals that are used when transmitting the data to the control device via a base station of a mobile telephone network and second radio signals that are used when transmitting the data to the control device without being mediated by the base station, and may transmit the captured image data using radio signals of which strength is low among the first radio signals and the second radio signals.

The flying device may further comprise an acquisition unit configured to acquire radio signal state information indicating a strength distribution of the first radio signals; and the transmission control unit may determine radio signals for transmitting the text data and the captured image data on the basis of the strength of the first radio signals on a flight path that is determined on the basis of the radio signal state information, and the strength of the second radio signals as measured.

The transmission control unit may determine, on the basis of radio signal state information, a transmission position to which the text data is to be transmitted that is determined on the basis of a flight speed and a timing at which the text data is to be transmitted, and may determine, on the basis of the strength of the first radio signals at the transmission position, radio signals for transmitting the captured image data while the text data is being transmitted.

A flying device according to a second embodiment of the present invention is a flying device that flies by being controlled from an external location, comprising a text data generation unit configured to generate text data regarding a state of the flying device during flight; an image data generation unit configured to capture images of a vicinity of a flight position at which the flying device is flying and generates captured image data; and a transmission control unit configured to prioritize transmission of the text data to a control device for controlling the flying device over transmission of the captured image data.

A control device according to a third embodiment of the present invention is a control device comprising a reception unit configured to receive, from a communication terminal, via a base station in a mobile telephone network, a usage request for a wireless communication channel on the mobile telephone network; a determination unit configured to, on the basis of terminal information contained in the usage request received by the reception unit, determine a terminal type of the communication terminal and a data type of data transmitted by the communication terminal; and a priority level control configured to, when a first condition that the terminal type determined by the determination unit is a flying device and the data type is flight data indicating a flight state of the flying device is satisfied, or when a second condition that the terminal type of the communication terminal is a flight control device for controlling the flying device and the data type is control data for controlling the flying device is satisfied, make a priority level for allocation of wireless resources higher than a priority level for allocation of wireless resources when the first condition and the second condition are not satisfied.

The reception unit may receive electric field strength information indicating an electric field strength in a vicinity of the flying device; and the priority level control unit may determine the priority level on the basis of the electric field strength information. Additionally, the reception unit may receive position information indicating a flight position of the flying device; and the priority level control unit may determine electric field strength information for a vicinity of the flying device on the basis of the flight position indicated by the position information and the electric field strength distribution information indicating a distribution of the electric field strength in accordance with position and altitude, and may determine the priority level on the basis of the determined electric field strength information.

The priority level control unit may set the priority level on the basis of the electric field strength information on a scheduled flight path that is determined on the basis of the electric field strength distribution information and the scheduled flight path of the flying device.

The priority level control unit may estimate a scheduled flight path of the flying device on the basis of the flight position and a flight speed of the flying device, and may determine the priority level on the basis of the electric field strength information on the scheduled flight path that is determined on the basis of the electric field strength distribution information and the scheduled flight path that was estimated.

The priority level control unit may output, to the base station including the scheduled flight path in a communication area thereof, an instruction to allocate the wireless resources to the flying device on the basis of the priority level.

The priority level control unit may acquire attributes of the flying device and determines the priority level on the basis of the acquired attributes. Additionally, the priority level control unit may determine the priority level on the basis of a type of application software used by the flying device. The priority level control unit determines the priority level on the basis of a flight speed of the flying device.

A communication control method according to a fourth embodiment of the present invention is a communication control method that is executed by a computer, and involves determining a communication quality of a wireless communication channel, used to transmit data to a control device that controls a flying device that flies by being controlled from an external location, in a prescribed range from a flight position at which the flying device is flying; and controlling a type of data transmitted to the control device on the basis of the communication quality that has been determined.

The communication control method of the fourth embodiment involves generating text data regarding a flight state of the flying device that is flying in air by being controlled from an external location; and generating capturing images of a vicinity of the flight position and generating captured image data; wherein the controlling involves prioritizing transmission of the text data to the control device for controlling the flying device over transmission of the captured image data.

A control method according to a fifth embodiment of the present embodiment involves receiving, from a communication terminal, via a base station in a mobile telephone network, a usage request for a wireless communication channel on the mobile telephone network; determining, on the basis of terminal information contained in the received usage request, a terminal type of the communication terminal and a data type of data transmitted by the communication terminal; and when a first condition that the determined terminal type is a flying device and the data type is flight data indicating a flight state of the flying device is satisfied, or when a second condition that the terminal type of the communication terminal is a flight control device for controlling the flying device and the data type is control data for controlling the flying device is satisfied, making a priority level for allocation of wireless resources higher than a priority level for allocation of wireless resources when the first condition and the second condition are not satisfied.

Advantageous Effects of Invention

The present invention provides the effect of being able to reduce transmission delays in data transmitted and received between a flying device and a control device.

DESCRIPTION OF EMBODIMENTS

First Embodiment

Summary of Present Embodiment

Figure 1:
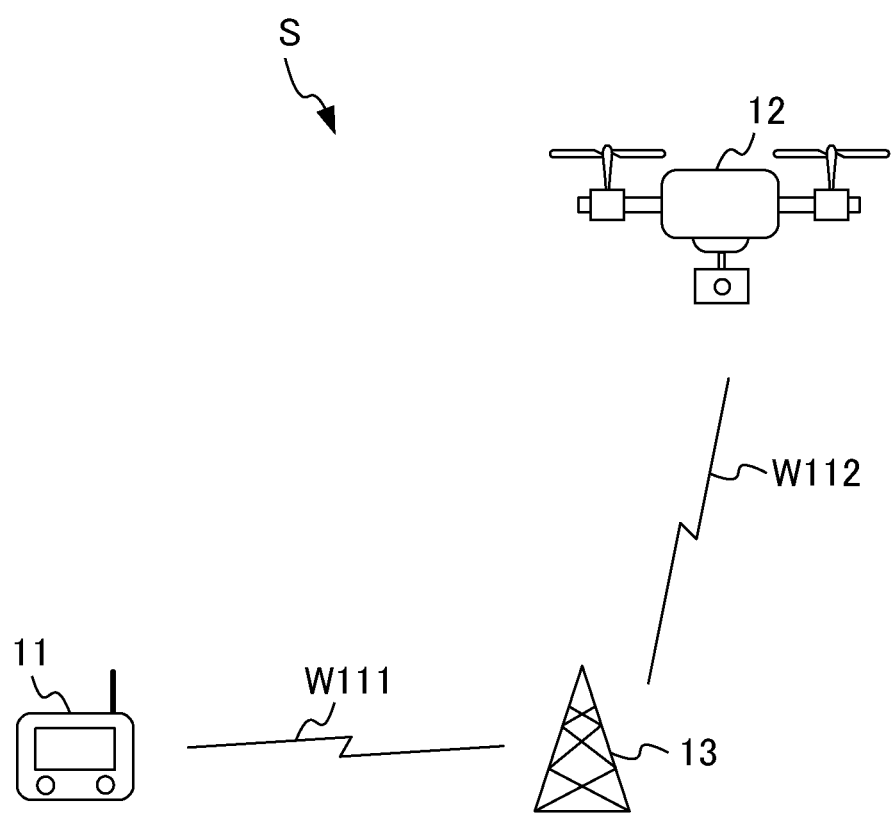
FIG. 1 is a diagram showing the structure of a flying system according to a first embodiment.

FIG. 1 is a diagram showing the structure of a flying system S according to the first embodiment. The flying system S comprises a control device 11 and a flying device 12. The flying device 12 is, for example, a drone, that can be controlled by a user using the control device 11. The control device 11 is a terminal, such as a transmitter, a smartphone or a tablet, that can transmit control information for controlling the flying device 12 via a wireless communication channel.

When a user operates the control device 11, the control device 11 transmits, to the flying device 12, control information in accordance with the operation content. The flying device 12 performs flight control using the control information received from the control device 11. Flight control includes control of the flight direction and flight speed of the flying device 12, and specifically involves controlling propellers and rudders on the flying device 12. Additionally, the flying device 12 transmits, to the control device 11, flight information that is necessary for control, such as the flight position and the flight speed. The flight information may, for example, be information relating to the position, altitude, speed, direction, orientation (tilt), wind speed and remaining battery level of the flying device 12. The flying device 12 has a camera and transmits image data captured and generated by the camera to the control device 11.

The control device 11 and the flying device 12 can transmit and receive control information, flight information and image data using the wireless communication channel. The control device 11 and the flying device 12, for example, transmit and receive information via a wireless communication channel W111, a base station 13 of a mobile telephone network and a wireless communication channel W112.

The wireless communication channel W111 and the wireless communication channel W112 are, for example, LTE (Long Term Evolution) channels. The wireless communication channel W111 is a wireless communication channel between the base station 13 and the control device 11, which is a type of mobile terminal in a mobile telephone network. The wireless communication channel W112 is a wireless communication channel between the base station 13 and the flying device 12, which is a type of mobile terminal in the mobile telephone network.

Figure 2:
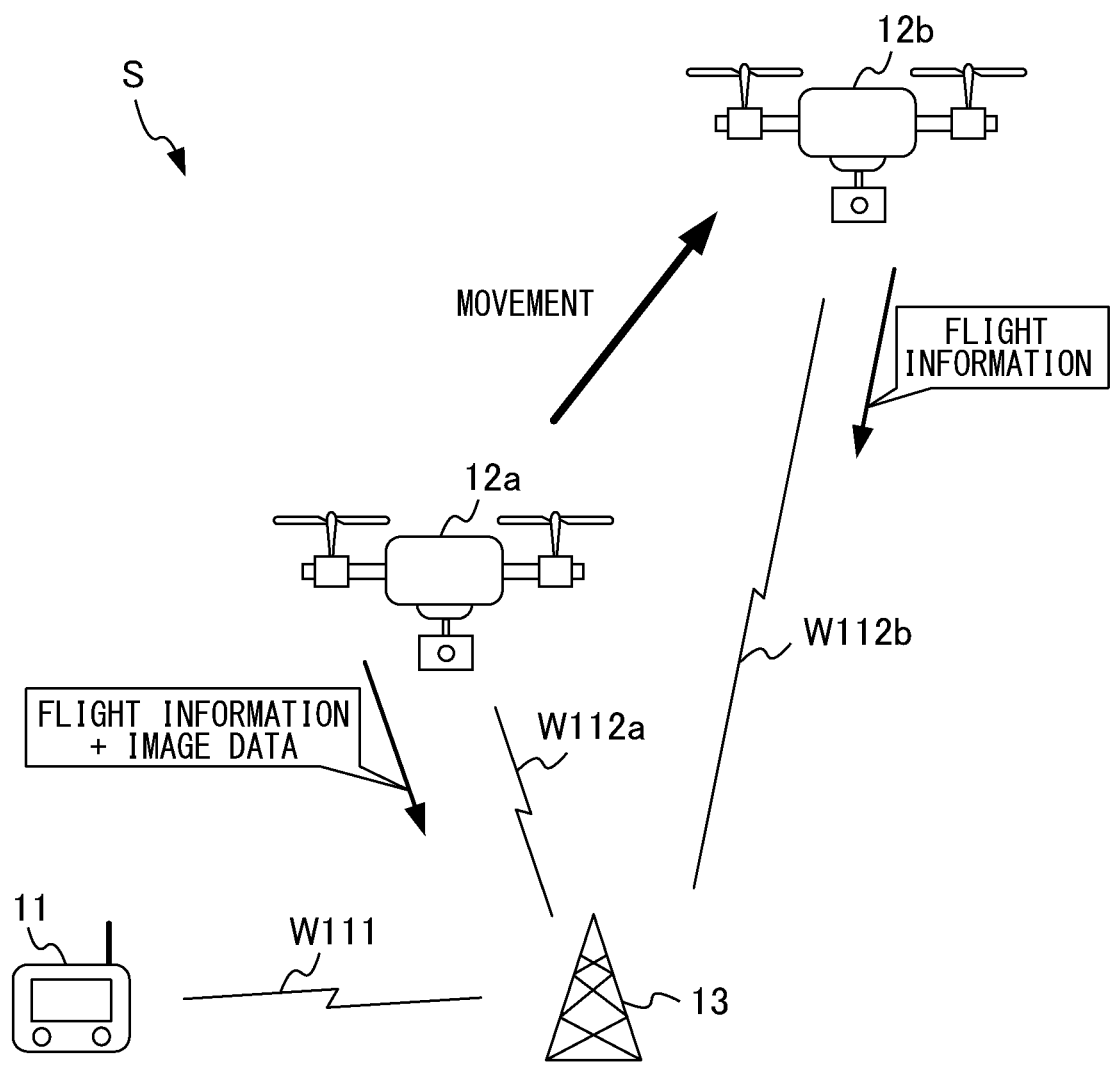
FIG. 2 is a diagram for explaining the content of data transmitted from a flying device to a control device according to the first embodiment.

FIG. 2 is a diagram for explaining the contents of data transmitted from the flying device 12 to the control device 11 according to the first embodiment. The flying device 12 controls the type of data transmitted to the control device 11 on the basis of the communication quality of the wireless communication channel W112 used to transmit data to the control device 11 within a prescribed range from the flight position.

For example, when the communication quality of the wireless communication channel W112a is good at the position of the flying device 12a shown in FIG. 2, the flying device 12 transmits, to the control device 11, captured image data generated by capturing images of the environs with the camera, and text data including flight information, which is information relating to the flying device.

When the communication quality of the wireless communication channel W112b is not good at the position of the flying device 12b shown in FIG. 2, the flying device 12 does not transmit captured image data to the control device 11, and transmits only flight information to the control device 11. By providing this feature, even if the communication quality of the wireless communication channel W112a is low and the effective transmission rate is low, it is made more certain that the flight information that is important for controlling the flying device 12 will reach the control device 11. As a result thereof, it is possible to ensure the flight safety of the flying device 12.

Hereinbelow, the structures of the control device 11 and the flying device 12 will be explained in detail.

[Structure of Control Device 11]

Figure 3:
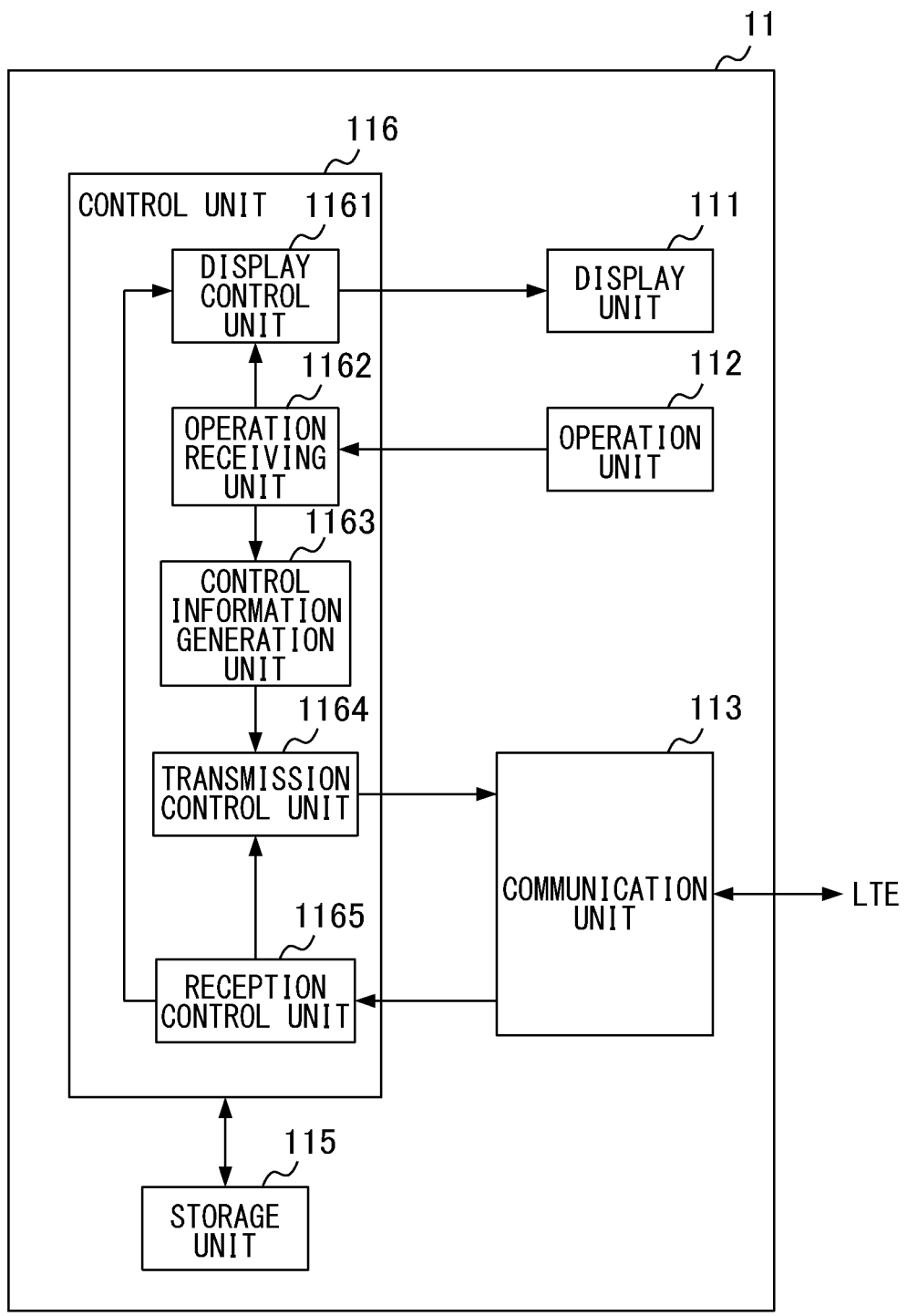
FIG. 3 is a diagram showing the structure of the control device according to the first embodiment.

FIG. 3 is a diagram showing the structure of the control device 11 according to the first embodiment. The control device 11 has a display unit 111, an operation unit 112, a communication unit 113, a storage unit 115 and a control unit 116. The control unit 116 has a display control unit 1161, an operation receiving unit 1162, a control information generation unit 1163, a transmission control unit 1164 and a reception control unit 1165.

The display unit 111 is a display for displaying information necessary for a user to control the flying device 12. The display unit 111 displays display data that is inputted from the display control unit 1161.

The operation unit 112 is a device for a user to perform operations for controlling the flying device 12, and for example, includes joysticks or volume controls for controlling the flight direction and flight speed. The operation unit 112 may further include a touch panel provided on the surface of the display unit 111. The operation unit 112 notifies the operation receiving unit 1162 of signals in accordance with the user's operations.

The communication unit 113 is a communication module that transmits and receives radio signals for communicating by using the wireless communication channel W111. The communication unit 113 has a modulator for modulating transmission data that is input from the transmission control unit 1164, and an RF unit for transmitting the modulated data as an RF signal in a frequency band that is allocated to Wi-Fi (registered trademark). Additionally, the communication unit 113 has a demodulator for demodulating RF signals that the RF unit has received from the flying device 12. The demodulator inputs the demodulated reception data to the reception control unit 1165.

The storage unit 115 is a storage medium including a ROM (Read Only Memory), a RAM (Random Access Memory) or the like. The storage unit 115 stores programs that are executed by the control unit 116. Additionally, the storage unit 115 is used as a work memory for the control unit 116, and for example, temporarily stores flight information received from the flying device 12.

The control unit 116 is, for example, a CPU (Central Processing Unit) that executes the programs stored in the storage unit 115 and thereby functions as the display control unit 1161, the operation receiving unit 1162, the control information generation unit 1163, the transmission control unit 1164 and the reception control unit 1165.

The display control unit 1161 generates display data to be displayed on the display unit 111. The display control unit 1161 displays the display data on the display unit 111 by inputting the generated display data to the display unit 111. The display control unit 1161, for example, makes the display unit 111 display the display data based on the operations of a user received via the operation receiving unit 1162. Additionally, the display control unit 1161 makes the display unit 111 display the display data based on the flight information from the flying device 12 received via the reception control unit 1165.

The operation receiving unit 1162 determines the user's operations on the basis of signals indicating operations input from the operation unit 112. The operation receiving unit 1162 notifies the display control unit 1161 and the control information generation unit 1163 of the determined operations.

The control information generation unit 1163 generates control information for controlling the flying device 12 on the basis of the operations reported by the operation receiving unit 1162. The control information generation unit 1163 generates control information including a flight direction and a flight speed designated by the user, and inputs the generated control information to the transmission control unit 1164.

The transmission control unit 1164 transmits control information for controlling the flying device 12 using the wireless communication channel W111. The transmission control unit 1164 inputs the control information inputted from the control information generation unit 1163 to the communication unit 113 and thereby transmits the control information to the flying device 12 via the wireless communication channel W111.

The reception control unit 1165 notifies the display control unit 1161 of flight information received from the flying device 12 via the communication unit 113.

[Structure of Flying Device 12]

Figure 4:
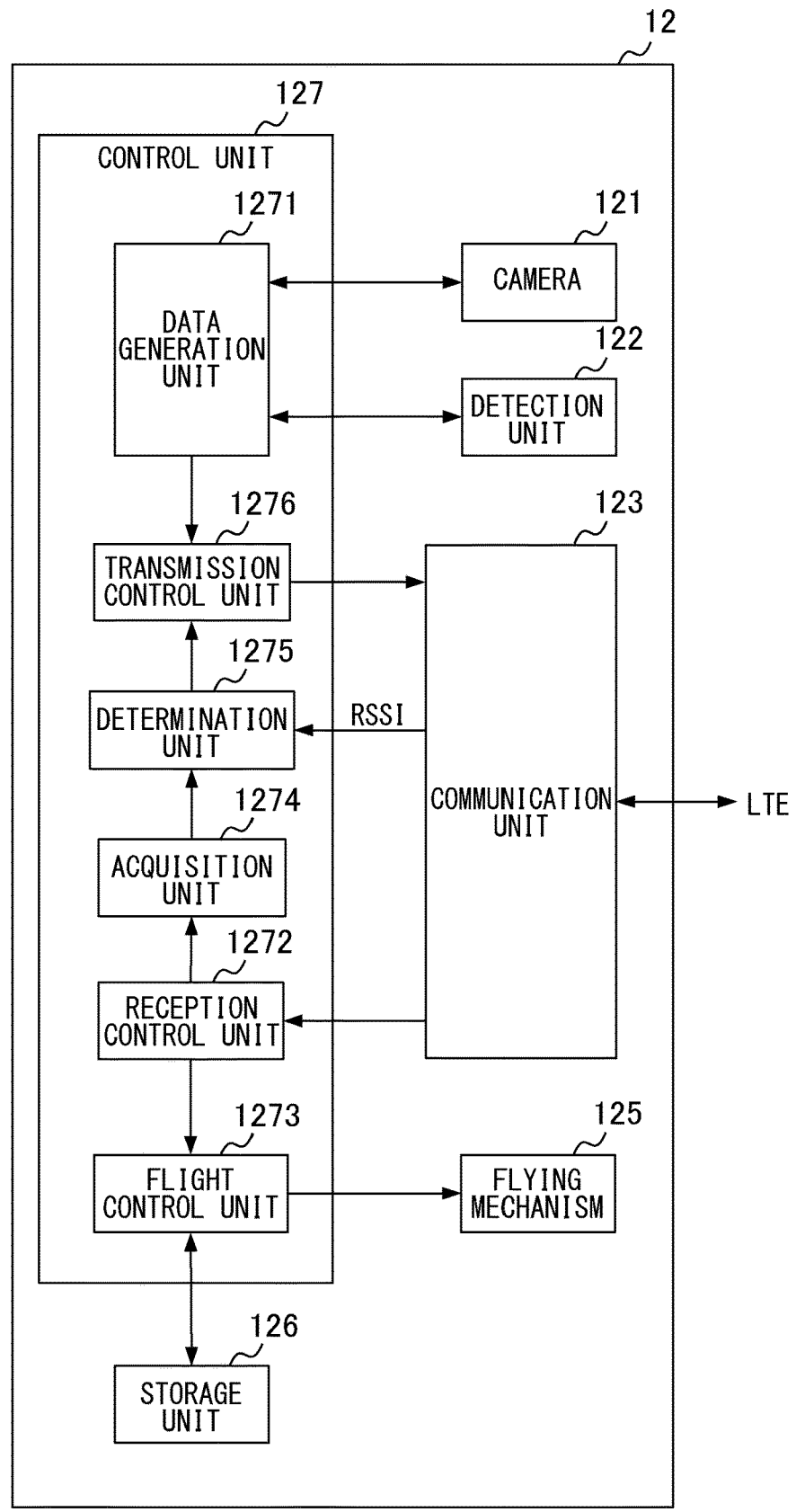
FIG. 4 is a diagram showing the structure of the flying device according to the first embodiment.

FIG. 4 is a diagram showing the structure of the flying device 12 according to the first embodiment. The flying device 12 has a camera 121, a detection unit 122, a communication unit 123, a flying mechanism 125, a storage unit 126 and a control unit 127. The control unit 127 has a data generation unit 1271, a reception control unit 1272, a flight control unit 1273, an acquisition unit 1274, a determination unit 1275 and a transmission control unit 1276.

The camera 121 captures images of the environs of the flying device 12 and generates captured image data. The camera 121 outputs the generated captured image data to the data generation unit 1271. The detection unit 122 includes, for example, an acceleration sensor and a GPS (Global Positioning System) receiver. The detection unit 122 outputs information for determining the state of the flying device 12, such as the flight speed, the tilt and the flight position of the flying device 12, to the data generation unit 1271.

The communication unit 123 is a communication module that transmits and receives radio signals for communicating over the wireless communication channel W112, and has a function similar to that of the communication unit 113.

The flying mechanism 125 includes propellers, motors for rotating the propellers, rudders and the like. The flying mechanism 125 can change the flight speed and the flight direction by making these mechanisms operate on the basis of control by the flight control unit 1273.

The storage unit 126 is a storage medium including a ROM, a RAM or the like. The storage unit 126 stores programs that are executed by the control unit 127. Additionally, the storage unit 126 is used as a work memory for the control unit 127, and for example, temporarily stores control information received from the control device 11.

The control unit 127 is, for example, a CPU. The control unit 127 executes the programs stored in the storage unit 126 and thereby functions as the data generation unit 1271, the reception control unit 1272, the flight control unit 1273, the acquisition unit 1274, the determination unit 1275 and the transmission control unit 1276.

The data generation unit 1271 generates captured image data on the basis of images that are inputted from the camera 121. The data generation unit 1271, for example, instructs the camera 121 to capture an image of the environs of the flight position every designated period of time, acquires the images captured by the camera 121, and generates captured image data to which information indicating the times and positions of image capture are appended. The data generation unit 1271 inputs the generated captured image data to the transmission control unit 1276.

Additionally, the data generation unit 1271 acquires the information for determining the state of the flying device 12 that is inputted from the detection unit 122. On the basis of the acquired information, the data generation unit 1271 generates text data including flight information regarding the flight state of the flying device 12. The data generation unit 1271 may generate text data including position information and information indicating the radio signal strength of the wireless communication channel W112. The radio signal strength is, for example, an electric field strength of radio signals transmitted from an antenna. The data generation unit 1271 inputs the generated text data to the transmission control unit 1276.

The reception control unit 1272 receives control information via the wireless communication channel W112. The reception control unit 1272 stores the control information received by the communication unit 123 via the wireless communication channel W112 in the storage unit 126, and notifies the flight control unit 1273 that the control information has been received.

The flight control unit 1273 controls the flight state by controlling the flying mechanism 125 on the basis of the control information received from the control device 11. If the received control information includes the time that the control information was generated, the flight control unit 1273 controls the flight state on the basis of the control information including the newest time. For example, if the reception control unit 1272 has received multiple sets of control information generated at different times but containing the same control contents, the flight control unit 1273 uses the control information generated at the newest time and deletes the other control information from the storage unit 126. By providing this feature, the memory capacity of the storage unit 126 can be suppressed.

The acquisition unit 1274 acquires radio signal state information indicating the radio signal strength distribution of the wireless communication channel W112 used for data transmission. The radio signal state information is information in which the spatial position (latitude, longitude, height) at which the flying device 12 flies is associated with the radio signal strength of the wireless communication channel W112. The radio signal state information is prepared on the basis of the radio signal strength at many positions that have been measured beforehand by many flying devices 12. The acquisition unit 1274 may acquire the radio signal state information via the wireless communication channel W112, and may acquire radio signal state information stored in the storage unit 126.

The determination unit 1275 determines the communication quality of the wireless communication channel W112 used for data transmission to the control device 11 within a prescribed range from the flight position of the flying device 12. The determination unit 1275 notifies the transmission control unit 1276 of the determined communication quality. The determination unit 1275 determines the communication quality on the wireless communication channel W112 by a means such as a received signal strength indicator (RSSI) indicating the strength of a received radio signal, the bit error rate of transmitted and received data, the number of times data was retransmitted and the like, outputted from the communication unit 123.

The determination unit 1275 may determine the communication quality at a position within a prescribed range in which flight is predicted. The determination unit 1275, for example, estimates a predicted flight position on the basis of the flight direction indicated by the control information received from the control device 11 and the flight position determined by the data generation unit 1271. The determination unit 1275 determines the communication quality at the predicted positions on the basis of the radio signal strengths at the predicted flight positions, determined by using the radio signal state information acquired by the acquisition unit 1274.

Figure 5:
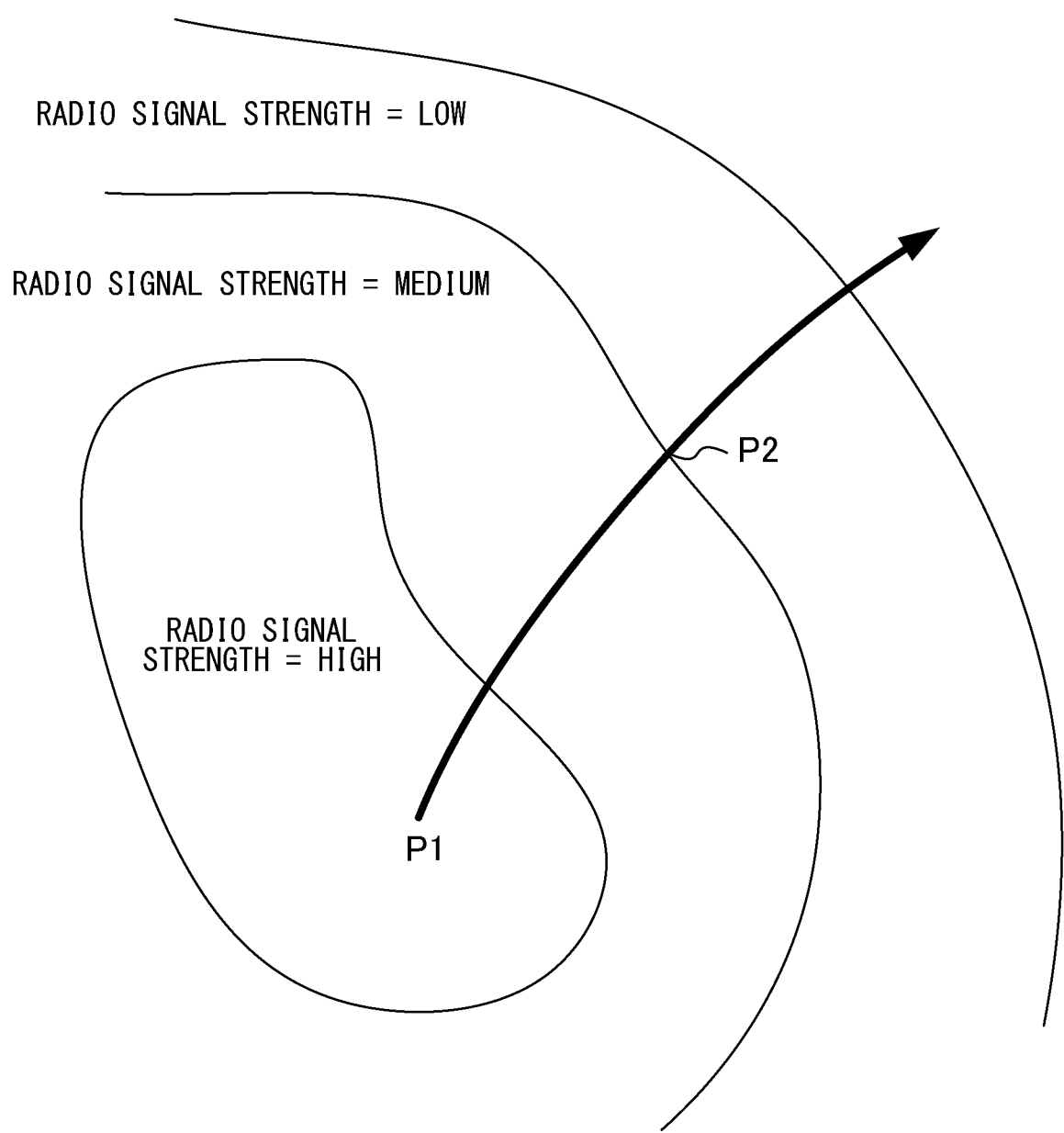
FIG. 5 is a diagram schematically showing radio signal state information according to the first embodiment.

FIG. 5 is a diagram schematically showing radio signal state information according to the first embodiment. FIG. 5 shows an area in which strength of the radio signals is high, an area in which strength of the radio signals is medium, and an area in which strength of the radio signals is low. Suppose that the position P1 in FIG. 5 is the current position of the flying device 12, and the flying device 12 is at a position in which strength of the radio signals is high. The arrow in FIG. 5 indicates the scheduled flight path of the flying device 12. According to FIG. 5, as the flying device 12 flies along the scheduled flight path, strength of the radio signals become lower, and at position P2, the flying device 12 enters an area in which strength of the radio signals is low. The determination unit 1275 determines that the communication quality has become lower, for example, when strength of the radio signals become low at the position P2.

The determination unit 1275 may estimate, further on the basis of the flight speed of the flying device 12, the predicted flight position after a prescribed period of time has elapsed. The determination unit 1275 determines the communication quality after the prescribed period of time has elapsed on the basis of the radio signal strength at the position of the flying device 12 after the prescribed period of time has elapsed, determined by using the radio signal state information acquired by the acquisition unit 1274.

The transmission control unit 1276 transmits the captured image data and the text data inputted from the data generation unit 1271 to the control device 11 via the communication unit 123. The transmission control unit 1276 controls the type of data transmitted to the control device 11 on the basis of the communication quality determined by the determination unit 1275. Specifically, when the communication quality determined by the determination unit 1275 is a threshold value or higher, the transmission control unit 1276 transmits, to the control device 11 for control, the captured image data and the text data including information regarding the flying device 12. Additionally, when the communication quality determined by the determination unit 1275 is less than the threshold value, the transmission control unit 1276 transmits the text data to the control device 11 without transmitting the captured image data to the control device 11. When the communication quality determined by the determination unit 1275 becomes worse, the transmission control unit 1276 may make the size of the captured image data smaller by raising the degree of compression of the captured image data in steps or by lowering the number of pixels (resolution) in the captured image data in steps, in accordance with the degree of worsening. Additionally, when the communication quality determined by the determination unit 1275 becomes worse, the frequency of transmission of the captured image data may be lowered.

The transmission control unit 1276 may control the type of data to be sent to the control device 11 on the basis of the communication quality of the wireless communication channel W111 acquired from the control device 11 via the reception control unit 1272. The transmission control unit 1276 may transmit text data to the control device 11 without transmitting captured image data to the control device 11 if the communication quality of either the wireless communication channel W111 or the wireless communication channel W112 is less than a threshold value.

Additionally, the transmission control unit 1276 may control the type of data that the flying device 12 transmits to the control device 11 on the basis of the communication quality determined by the determination unit 1275 using the radio signal state information. For example, the transmission control unit 1276 estimates the radio signal state at a position at which the flying device 12 is scheduled to arrive on the basis of the radio signal state information and the scheduled flight path of the flying device 12. Furthermore, the transmission control unit 1276 may determine a data type to be transmitted on the basis of the communication quality at a position where the flying device 12 is scheduled to arrive, the position being estimated on the basis of the estimated radio signal state. By providing this feature, the transmission control unit 1276 can stop the transmission of captured image data for the case in which it is predicted that the communication quality will become lower. As a result thereof, it is possible to prevent the degradation of the communication quality during the transmission of the captured image data, and to prevent the occurrence of problems in the transmission of the text data.

The transmission control unit 1276 may determine the communication quality on the basis of the time at which data was transmitted to the control device 11 and the time at which data was received by the control device 11. The transmission control unit 1276, for example, in response to the transmitting of data, receives a response including the time at which the control device 11 received the data, and evaluates that the communication quality is poor as the time between the transmission time and the reception time increases.

When the communication quality of the wireless communication channel W111 or the wireless communication channel W112 is poor, the transmission rate becomes lower. For this reason, if captured image data in which the data amount is relatively large is transmitted, the timing at which the text data, which includes flight information that is indispensable for controlling flight, reaches the control device 11 may be delayed, or the text data may be unable to be transmitted. However, as mentioned above, the transmission control unit 1276 controls whether or not to transmit the captured image data on the basis of the communication quality of the wireless communication channel W111 or the wireless communication channel W112. As a result thereof, text data transmission delays can be suppressed, so the reliability of flight control can be raised.

The transmission control unit 1276 may receive a notification of the flight speed from the data generation unit 1271, and may set the communication quality threshold value for deciding that the captured image data will not be transmitted on the basis of the flight speed. The faster the flight speed, the greater the impact on control when the timing by which flight information reaches the control device 11 is delayed. Therefore, the transmission control unit 1276 may raise the communication quality threshold value as the flight speed becomes faster so that the transmission of the captured image data is stopped at a stage in which there is little degradation of the communication quality.

The transmission control unit 1276 may set the threshold value for deciding whether or not to transmit the captured image data on the basis of attributes of an area in flight. The transmission control unit 1276 lowers the communication quality threshold value during flight in a location requiring highly precise operation, so that captured image data is transmitted in real-time as much as possible even when the rate of degradation of the communication quality is high and the image quality is degraded. Locations in which highly precise operation is necessary are, for example, urban areas in which there are buildings, in the vicinity of no-fly areas near airports, locations where there are many other flying devices, and locations in which sensor or camera measurements indicate that there is a structure nearby.

The transmission control unit 1276 may store non-transmitted captured image data in the storage unit 126 and transmit the captured image data stored in the storage unit 126 to the control device 11 after the communication quality of the wireless communication channel W111 and the wireless communication channel W112 recovers to a prescribed level. By providing this feature, even if the communication quality of the wireless communication channel W111 and the wireless communication channel W112 is temporarily degraded, the control device 11 can acquire all of the captured image data captured by the flying device 12 after the communication quality has recovered. Therefore, the user using the control device 11 can observe all of the captured image data.

When the communication quality determined by the determination unit 1275 is less than a threshold value, the transmission control unit 1276 may transmit, to the control device 11, report information indicating that the communication quality has become lower. By providing this feature, the control device 11 can notify a user that the communication quality of the wireless communication channel W111 has become lower. For this reason, the user who has received the notification can take measures to change the flight path.

[Action Sequence in Flying System S]

Figure 6:
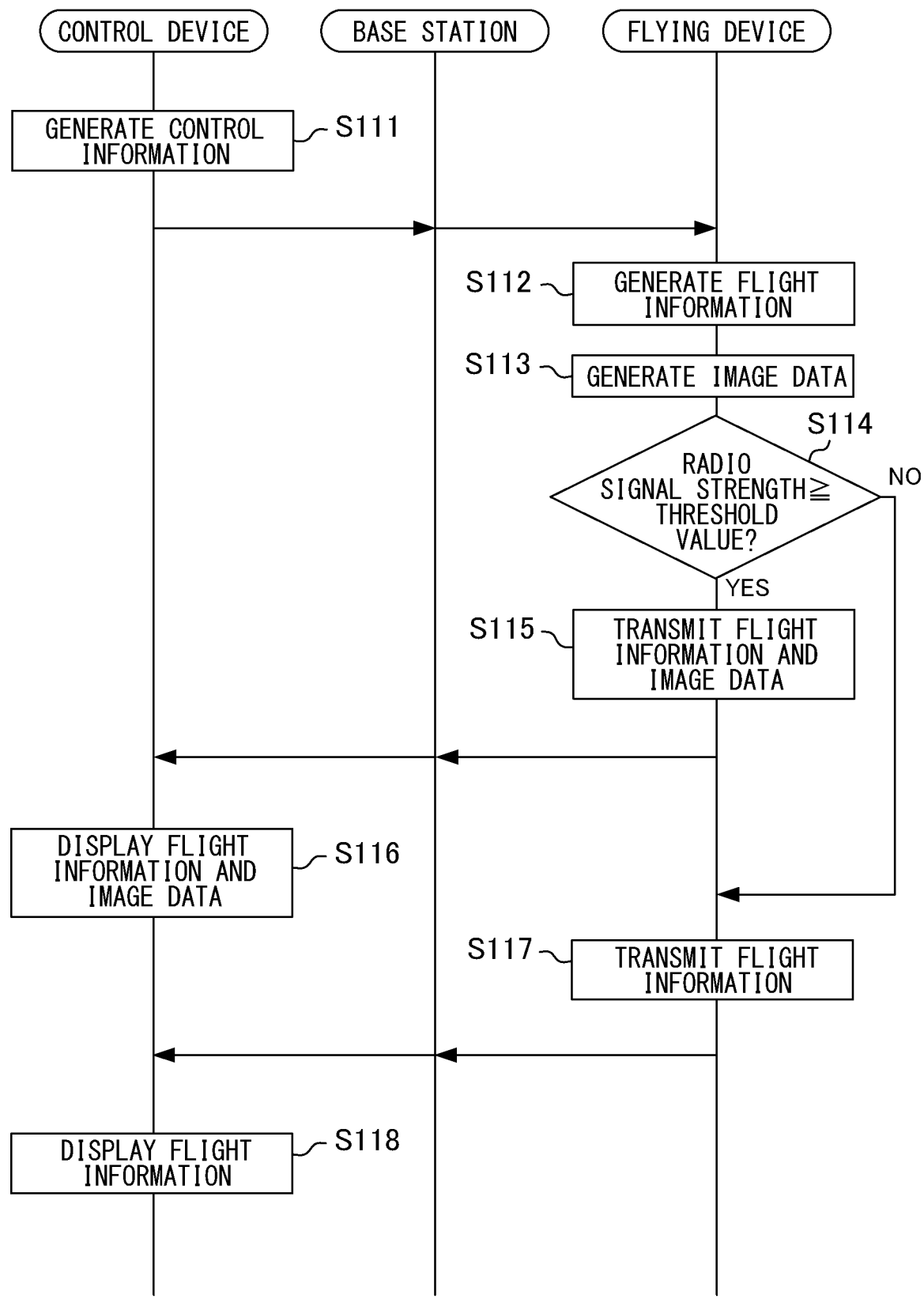
FIG. 6 is a diagram showing an example of the action sequence in a flying system according to the first embodiment.

FIG. 6 is a diagram showing an example of the action sequence in the flying system according to the first embodiment. First, the control information generation unit 1163 in the control device 11 generates control information for controlling the flying device 12 (S111). The transmission control unit 1164 transmits, to the base station 13, control information addressed to the flying device 12 via the wireless communication channel W111. The base station 13 transfers the control information to the flying device 12.

The flight control unit 1273 of the flying device 12 controls the flying mechanism 125 on the basis of the received control information. While the flying device 12 is flying, the data generation unit 1271 generates flight information (S112). Additionally, the data generation unit 1271 generates captured image data on the basis of the images captured by the camera 121 (S113).

Subsequently, the determination unit 1275 assesses whether or not the radio signal strength indicated by an RSSI signal outputted from the communication unit 123 is equal to or greater than a threshold value (S114). If the determination unit 1275 finds that the radio signal strength is equal to or greater than the threshold value (YES in S114), the transmission control unit 1276 transmits flight information and captured image data to the base station 13 via the wireless communication channel W112 (S115). The base station 13 transfers the received flight information and captured image data to the control device 11. The control device 11 displays the received flight information and captured image data on the display unit 111 (S116).

If the determination unit 1275 finds that the radio signal strength is lower than the threshold value (NO in S114), the transmission control unit 1276 transmits only flight information to the base station 13 without transmitting the captured image data (S117). The control device 11 displays the flight information received from the base station 13, and does not display the captured image data (S118).

Modified Example

In the explanation above, it was assumed that the flight information would still be able to be transmitted even if the communication quality on the wireless communication channel W112 became lower. However, it is conceivable that the communication quality might be too low to transmit the flight information. Therefore, the flight control unit 1273 may be arranged to change the flight path when it is determined that the communication quality of the wireless communication channel has decreased so much that the flight information cannot be transmitted, or when it is determined, on the basis of the radio signal state information, that the communication quality can be predicted to decrease so much that the flight information will not be able to be transmitted. For example, the flight control unit 1273 changes the flight path towards a direction in which the communication quality improves on the basis of the radio signal state information. The flight control unit 1273 may also change the flight path so as to return to the starting point.

Additionally, when captured image data stops being transmitted from the flying device 12, instead of displaying a screen where nothing is reflected on the display unit 111, the control unit 116 of the control device 11 may display that a screen cannot be displayed due to a poor radio signal, or may switch the display subject to a map image. The control unit 116 of the control device 11, for example, displays an image in which the flying device is viewed from above on a flat map, and an image in which the flying device 12 is viewed from the side, representing the relationship between the heights of the flying device 12 and buildings. Additionally, the control unit 116 in the control device 11 may switch the display to a screen displaying the flying device 12 three-dimensionally on a three-dimensional map so that the user can recognize the target destination and the direction of advancement.

[Advantageous Effects of Flying Device 12 of First Embodiment]

As explained above, in the flying device 12 of the first embodiment, the determination unit 1275 determines the communication quality of the wireless communication channel W112 in a prescribed range from the flight position. Furthermore, the transmission control unit 1276 controls the type of data transmitted to the control device 11 on the basis of the communication quality determined by the determination unit 1275. Specifically, when the communication quality is lower, the transmission control unit 1276 transmits flight information to the control device 11 without transmitting captured image data. By providing this feature, the probability that the flight information transmitted by the flying device 12 will reach the control device 11 is raised. For this reason, even if the communication quality of the wireless communication channel used for communication between the flying device 12 and the control device 11 becomes lower, it is possible to prevent reduced flight performance of the flying device 12.

Second Embodiment

In the first embodiment, an example for the case in which the control device 11 and the flying device 12 use one type of wireless communication channel W11 was explained. The second embodiment differs from the first embodiment in that the control device 11 and the flying device 12 use multiple wireless communication channels.

Figure 7:
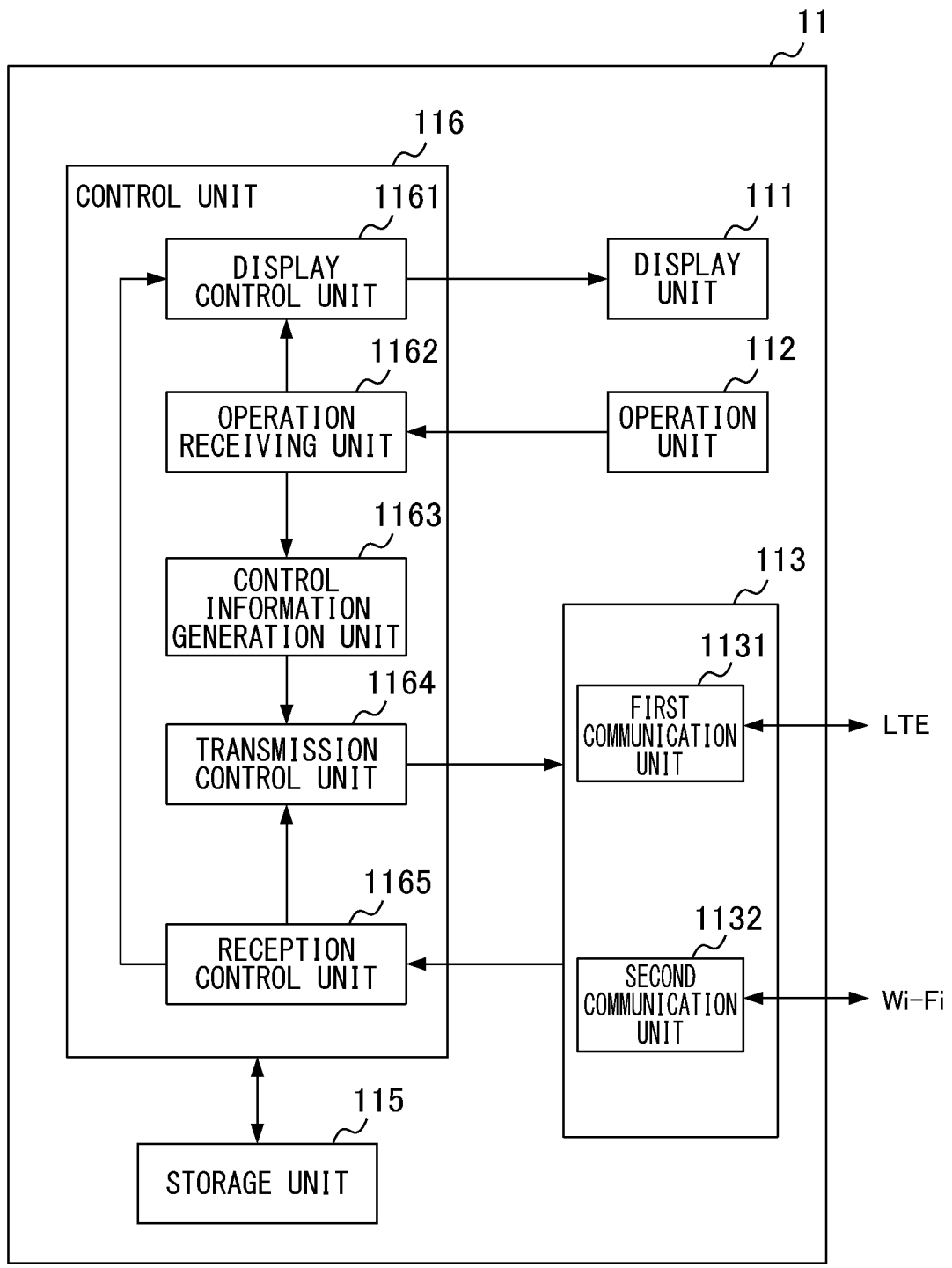
FIG. 7 is a diagram showing the structure of a control device according to a second embodiment.
Figure 8:
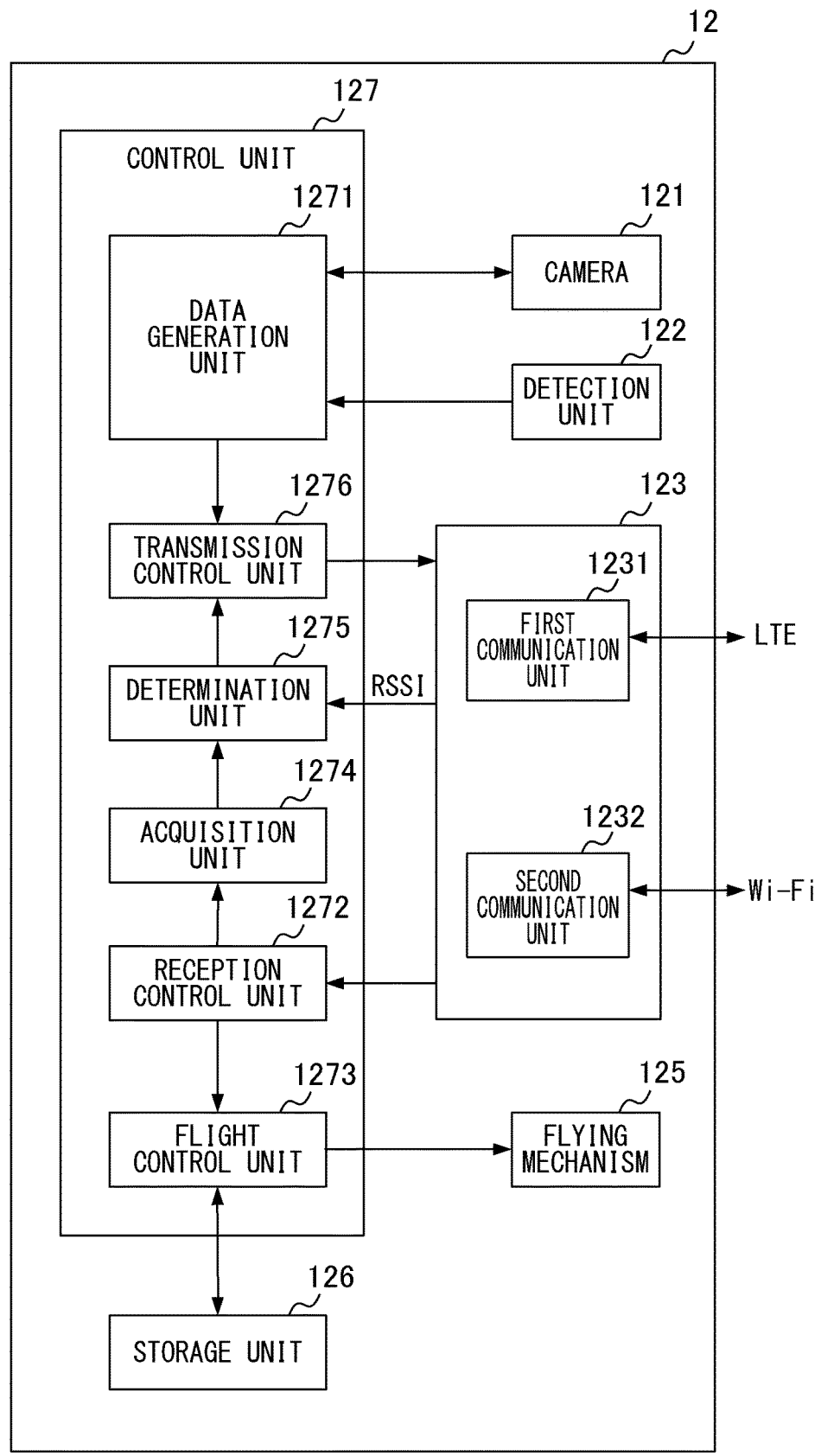
FIG. 8 is a diagram showing the structure of a flying device according to the second embodiment.

FIG. 7 is a diagram showing the structure of a control device 11 according to the second embodiment. FIG. 8 is a diagram showing the structure of a flying device 12 according to the second embodiment. The control device shown in FIG. 7 differs from the control device 11 shown in FIG. 3 in that the communication unit 113 has a first communication unit 1131 and a second communication unit 1132, and is the same in other respects. The first communication unit 1131 and the second communication unit 1132 transmit and receive radio signals on different frequency bands. For example, the first communication unit 1131 includes an LTE channel communication module for communicating via a base station 13, and the second communication unit 1132 includes, for example, a Wi-Fi channel communication module for communicating without being mediated by the base station 13. It is possible for the first communication unit 1131 to include an LTE channel communication module and the second communication unit 1132 to include a third-generation communication channel (3G channel) communication module.

The flying device 12 shown in FIG. 8 differs from the flying device 12 shown in FIG. 4 in that the communication unit 123 has a first communication unit 1231 and a second communication unit 1232, and is the same in all other respects. The first communication unit 1231 includes, for example, an LTE channel communication module, and the second communication unit 1232 includes, for example, a Wi-Fi channel communication module.

The transmission control unit 1276, in the default state, uses an LTE channel, which is a first wireless communication channel, to transmit captured image data and text data including flight information to the control device 11 via the first communication unit 1231. When the determination unit 1275 determines that the communication quality of the first wireless communication channel is lower than a prescribed threshold value, the transmission control unit 1276 notifies the control device 11 of report information indicating that the communication quality has degraded.

Upon receiving instructions from the control device 11 to switch the wireless communication channel, the transmission control unit 1276 switches to transmitting text data including flight information using a Wi-Fi channel, which is a second wireless communication channel, via the second communication unit 1232. The transmission control unit 1276 may continue to transmit flight information and captured image data using the first wireless communication channel after starting to transmit flight information using the second wireless communication channel.

The transmission control unit 1276 may start transmitting flight information using the second wireless communication channel at a time for which the determination unit 1275 has determined that there is a high probability that strength of the radio signals on the flight path will become lower on the basis of radio signal state information indicating the radio signal strength distribution on the first wireless communication channel. By providing this feature, it is possible to prevent situations in which the communication quality of the first wireless communication channel degrades too much and the transmission control unit 1276 cannot provide the control device 11 with report information.

Additionally, the transmission control unit 1276 may transmit, to the control device 11, report information indicating that the communication quality has become lower on the condition that the strength of the second radio signals on the second wireless communication channel are higher than the strength of the first radio signals at a position within a prescribed range through which flight is predicted. The strength of the first radio signals at a position within a prescribed range through which flight is predicted is determined on the basis of first radio signal state information indicating the strength distribution of the first radio signals on the first wireless communication channel. By providing this feature, the transmission control unit 1276 can prevent situations in which the communication channel is switched to the second wireless communication channel despite the communication quality of the first wireless communication channel being higher than the communication quality of the second wireless communication channel at a position through which flight is scheduled.

After transmitting the report information to the control device 11, the transmission control unit 1276 may store data to be transmitted to the control device 11 in the storage unit 126 until instructions to switch from the first wireless communication channel to the second wireless communication channel are received from the control device 11. Then, the transmission control unit 1276 transmits the data stored in the storage unit 126 to the control device 11 via the second wireless communication channel after having received instructions to switch to the second wireless communication channel. The transmission control unit 1276 may store only flight information in the storage unit 126 without storing the captured image data in the storage unit 126. By providing this feature, the transmission control unit 1276 is able to reliably transmit flight information to the control device 11 even if there is a period during which data cannot be transmitted using a wireless communication channel.

When the control device 11 is in a state in which data can always be received via the second wireless communication channel, the transmission control unit 1276 may transmit text data including flight information and the like using the second wireless communication channel, without transmitting report information, at the time the communication quality of the first wireless communication channel becomes lower.

[Advantageous Effects of Second Embodiment]

As explained above, the flying device 12 of the second embodiment is able to switch a wireless communication channel over which flight information is transmitted to another wireless communication channel when the communication quality of the wireless communication channel that is being used becomes lower. By providing this feature, it is possible to raise the probability that flight information can be transmitted normally even when the communication quality of the wireless communication channel becomes lower.

Third Embodiment

In the first embodiment and the second embodiment, it was decided whether or not captured image data would be transmitted on the basis of the communication quality of the wireless communication channels that could be used by the flying device 12. In contrast therewith, the transmission control unit 1276 of the third embodiment stops capturing images and transmits only text data when the remaining battery level in a battery providing power for flying the flying device 12 becomes lower than a prescribed threshold value. The transmission control unit 1276 may refer to a flight schedule, and if it is assessed that there is insufficient power remaining in the battery to allow the destination to be reached if normal actions for transmitting captured images are continued, the transmission control unit 1276 may stop capturing images and transmit only text data. Additionally, when the remaining battery level is low, the transmission control unit 1276 may stop transmitting the captured image data and also stop various functions (for example, a temperature detection function, an audio recording function and a collision detection function) other than the function of transmitting flight information.

Fourth Embodiment

Summary of Fourth Embodiment

Figure 9:
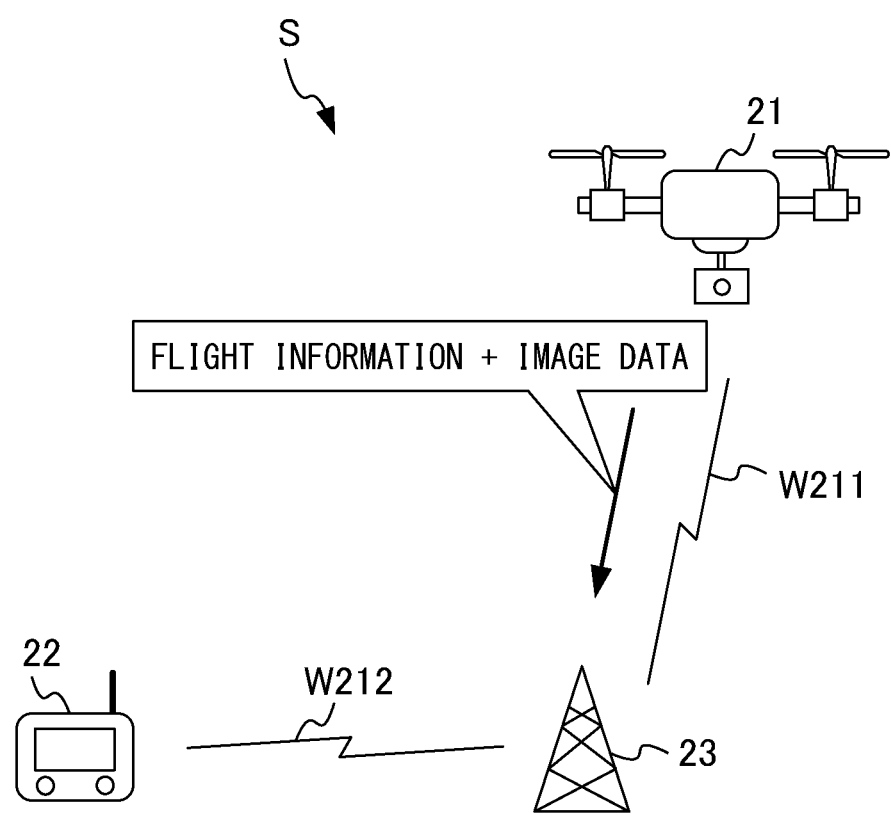
FIG. 9 is a diagram showing the structure of a flying system according to a fourth embodiment.

FIG. 9 is a diagram showing the structure of a flying system S according to the fourth embodiment. The flying system S comprises a control device 21 and a flying device 22. The flying device 21 is, for example, a drone, that can be controlled by a user using the control device 22. The control device 22 is a terminal, such as a transmitter, a smartphone or a tablet, that can transmit control information for controlling the flying device 21 via a wireless communication channel.

When a user operates the control device 22, the control device 22 transmits, to the flying device 21, control information in accordance with the operation content. The flying device 21 performs flight control by using the control information received from the control device 22. Flight control includes control of the flight direction and flight speed of the control device 22, and specifically involves controlling propellers and rudders on the control device 22. Additionally, the flying device 21 transmits, to the control device 22, flight information that is necessary for control, such as the flight position and the flight speed. The flight information may, for example, be information relating to the position, altitude, speed, direction and orientation (tilt) of the flying device 21, the wind speed, and information on the remaining amount of battery powering the flying device 21. The flying device 21 has a camera and transmits image data captured and generated by the camera to the control device 22.

The flying device 21 transmits flight information and captured image data using the wireless communication channel. The control device 22 transmits control information for controlling the flying device 21 using the wireless communication channel. The flying device 21 and the control device 22, for example, transmit and receive information via a wireless communication channel W211, a base station 23 of a mobile telephone network and a wireless communication channel W212.

The wireless communication channel W211 and the wireless communication channel W212 are, for example, LTE (Long Term Evolution) channels. The wireless communication channel W212 is a wireless communication channel between the base station 23 and the control device 22, which is a type of mobile terminal in a mobile telephone network, and the wireless communication channel W211 is a wireless communication channel between the base station 23 and the flying device 21, which is a type of mobile terminal in the mobile telephone network.

The flying device 21 prioritizes the transmission, to the control device for controlling the flying device, of text data (for example, flight information) relating to the state of the flying device during flight over the transmission of the captured image data. By providing this feature, in the flying system S, it is made more certain that the flight information that is important for controlling the flying device 21 will reach the control device 22 even when the flying device 21 needs to transmit captured image data, thereby ensuring the flight safety of the flying device 21.

Hereinbelow, the structure of the flying device 21 will be explained.

[Structure of Flying Device 21]

Figure 10:
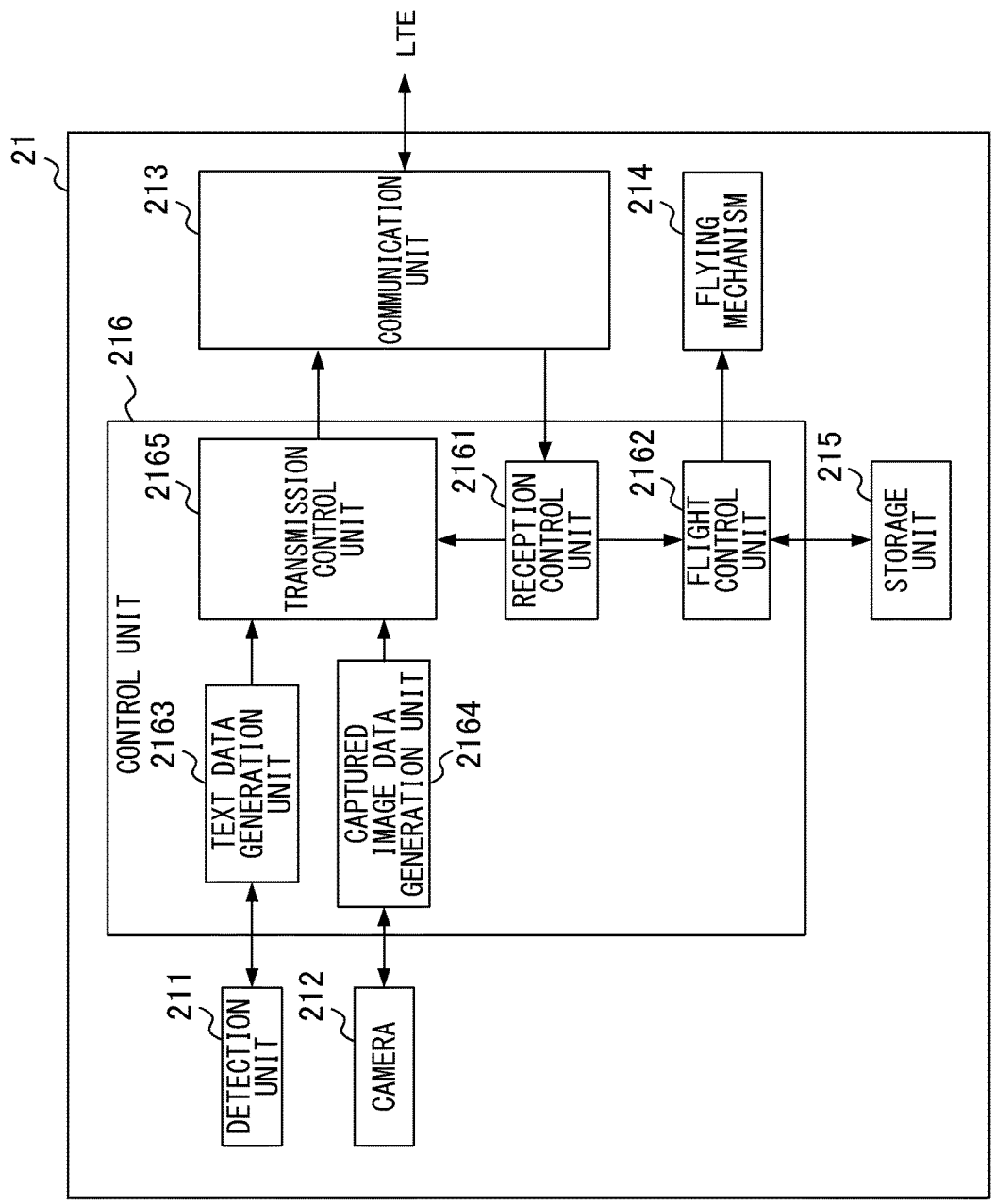
FIG. 10 is a diagram showing the structure of a flying device according to the fourth embodiment.

FIG. 10 is a diagram showing the structure of the flying device 21 according to the fourth embodiment. The flying device 21 has a detection unit 211, a camera 212, a communication unit 213, a flying mechanism 214, a storage unit 215 and a control unit 216. The control unit 216 has a reception control unit 2161, a flight control unit 2162, a text data generation unit 2163, a captured image data generation unit 2164 and a transmission control unit 2165.

The detection unit 211 includes, for example, an acceleration sensor and a GPS (Global Positioning System) receiver. The detection unit 211 outputs information for determining the state of the flying device 21, such as the flight speed, the tilt and the flight position of the flying device 21, to the text data generation unit 2163.

The camera 212 captures images of the environs of the flying device 21 and generates captured image data. The camera 212 outputs the generated captured image data to the captured image data generation unit 2164.

The communication unit 213 is a communication module that transmits and receives radio signals for communicating over the wireless communication channel W211. The communication unit 213 has a modulator for modulating transmission data that is input from the transmission control unit 2165, and an RF unit for transmitting the modulated data as an RF signal in a frequency band that is allocated to LTE channels. Additionally, the communication unit 213 has a demodulator for demodulating RF signals that the RF unit has received from a base station 23. The demodulator inputs the demodulated reception data to the reception control unit 2161.

The flying mechanism 214 includes propellers, motors for rotating the propellers, rudders and the like. The flying mechanism 214 can change the flight speed and the flight direction by making these mechanisms operate on the basis of control by the flight control unit 2162.

The storage unit 215 is a storage medium including a ROM (Read Only Memory), a RAM (Random Access Memory) or the like. The storage unit 215 stores programs that are executed by the control unit 216. Additionally, the storage unit 215 is used as a work memory for the control unit 216, and for example, temporarily stores control information received from the control device 22.

The control unit 216 is, for example, a CPU (Central Processing Unit). The control unit 216 executes the programs stored in the storage unit 215 and thereby functions as the reception control unit 2161, the flight control unit 2162, the text data generation unit 2163, the captured image data generation unit 2164 and the transmission control unit 2165.

The reception control unit 2161 receives control information via the wireless communication channel W211. The reception control unit 2161 stores the control information received by the communication unit 213 via the wireless communication channel W211 in the storage unit 215, and notifies the flight control unit 2162 that the control information has been received.

The flight control unit 2162 controls the flight state by controlling the flying mechanism 214 on the basis of the control information received from the control device 22. If the control information received from the control device 22 includes the time that the control information was generated, the flight control unit 2162 controls the flight state on the basis of the control information including the newest time.

The text data generation unit 2163 generates text data relating to the state of the flying device 21 during flight. Specifically, the text data generation unit 2163 generates text data indicating output values of various types of sensors that the detection unit 211 has, or generates text data with predetermined contents that is associated with the output values. The text data generation unit 2163 generates text data indicating the flight speed, tilt, flight position and the like of the flying device 21 on the basis, for example, of output values from an acceleration sensor. The text data generation unit 2163 may generate text data including information indicating the radio signal strength of the wireless communication channel W211 detected in the communication unit 213. The text data generation unit 2163 inputs the generated text data to the transmission control unit 2165.

The captured image data generation unit 2164 makes the camera 212 capture images of the environs of the flight position of the flying device 21 and generates captured image data. The captured image data generation unit 2164 generates captured image data on the basis of image signals input from the camera 212. The captured image data generation unit 2164, for example, instructs the camera 212 to capture an image of the environs of the flight position every designated period of time, acquires image signals outputted by the camera 212, and generates captured image data to which information indicating the times and positions of image capture are appended. The captured image data generation unit 2164 inputs the generated captured image data to the transmission control unit 2165.

The transmission control unit 2165 transmits text data input from the text data generation unit 2163 and captured image data input from the captured image data generation unit 2164 to the control device 22 via the communication unit 213. The transmission control unit 2165 prioritizes the transmission of text data to the control device 22 for controlling the flying device 21 over the transmission of captured image data.

The transmission control unit 2165, for example, executes priority control in which the transmission of text data is prioritized over the transmission of captured image data under the condition that the communication quality of the wireless communication channel W211 used for transmitting the captured image data and the text data has lowered to a prescribed threshold value or less. The communication quality is determined, for example, by the strength of the radio signals on the wireless communication channel W211 that the communication unit 213 received from the base station 23, the bit error rate when transmitting/receiving data with the control device 22, and the number of times data was retransmitted when transmitting/receiving data with the control device 22.

The transmission control unit 2165 executes priority control on the basis of the communication quality. As a result thereof, the transmission control unit 2165 transmits text data and captured image data to the control device 22 while the communication quality on the wireless communication channel W211 is good. Additionally, when the communication quality has become lower, the transmission control unit 2165 can make sure that the highly important text data reaches the control device 22. By providing this feature, a user controlling the flying device 21, in the normal state, can smoothly control the device using both text data and captured image data. Additionally, even under conditions that are not suitable for communicating captured image data, the user can continue to safely control using text data that is important for control.

The transmission control unit 2165 may determine the strength of the radio signals on the wireless communication channel W211 on the basis of the radio signal state information indicating the strength distribution of the radio signals acquired by the reception control unit 2161, instead of determining the communication quality by actually measuring the strength of the radio signals on the wireless communication channel W211. The radio signal state information is information that has been prepared beforehand on the basis of radio signal strengths actually measured by many other flying devices.

The radio signal state information is as explained by referring to FIG. 5 in the first embodiment. Suppose that the position P1 in FIG. 5 is the current position of the flying device 21, and the flying device 21 is in a position at which strength of the radio signals is high. The radio signal strength is, for example, the electric field strength of radio signals transmitted from an antenna. The arrow in FIG. 5 indicates the scheduled flight path of the flying device 21. According to FIG. 5, as the flying device 21 flies along the scheduled flight path, strength of the radio signals become lower, and at the position P2, the flying device 21 enters an area in which strength of the radio signals is low. The transmission control unit 2165 estimates the strength of the radio signals at a position at which flight is scheduled on the basis of the scheduled flight positions and the radio signal state information of the flying device 21. The transmission control unit 2165 executes priority control on the basis of the communication quality at the scheduled flight positions, determined on the basis of the estimated strength of the radio signals.

By providing this feature, the transmission control unit 2165 can start implementing priority control early when there is a high probability that the communication quality will degrade if flight is continued along the scheduled flight path. As a result thereof, even if the communication quality suddenly falls, it becomes possible to improve the probability that important text data will reach the control device 22 by starting the priority control beforehand.

The condition for the transmission control unit 2165 to execute priority control may be such that priority control is executed when another condition is satisfied instead of when the communication quality of the wireless communication channel W211 becomes low, or in addition to when the communication quality of the wireless communication channel W211 becomes low. For example, the transmission control unit 2165 may prioritize the transmission of text data to the control device 22 over the transmission of captured image data on the condition that the flight position of the flying device 21 detected by a detection unit 211, which functions as a position detection unit, is contained in a prescribed area.

Specifically, the transmission control unit 2165 prioritizes the transmission of text data in areas in which collision accidents tend to occur, so that flight information more reliably reaches the control device 22. Areas in which collision accidents tend to occur are areas, such as urban areas, in which crashes have a large impact, or areas in which many other flying devices are flying. By providing this feature, it is possible to improve the safety while the flying device 21 is flying.

In scarcely populated areas or regions in which almost no other flying devices are flying, the importance of prioritizing the transmission of text data is relatively low. Therefore, the transmission control unit 2165 may assess whether or not to execute priority control on the basis of map information, such as the population density or the number of flying devices that are flying, indicating the level of the need for highly safe flight. Additionally, the transmission control unit 2165 may assess whether or not to execute priority control on the basis of instructions from the control device 22 or a control station.

[Priority Control Method]

The transmission control unit 2165 is able to use various priority control methods.

The transmission control unit 2165 performs retransmission control in which, if a response is not received from a control device 22 until a prescribed period of time elapses after data is transmitted to the control device 22, the same data is retransmitted to the control device 22. At this time, if many sets of captured image data having a large data volume are to be repeatedly retransmitted, the wireless communication channel W211 is used for retransmitting the captured image data. As a result thereof, the effective transmission rate of the text data becomes lower.

Therefore, the transmission control unit 2165 makes the time during which the retransmission process is continued when transmitting text data longer than the time during which the retransmission process is continued when transmitting captured image data. For example, the transmission control unit 2165 cancels the retransmission of captured image data at the time a prescribed retransmission-permitted period elapses, but continues to retransmit the text data even after the retransmission-permitted period has elapsed. By providing this feature, the transmission control unit 2165 is able to make more certain that the text data reaches the control device 22.

Additionally, the transmission control unit 2165 may reduce the amount of the captured image data for a prescribed time before the timing at which the text data is to be transmitted. For example, the transmission control unit 2165 divides the captured image data during a prescribed period before the timing at which the text data is to be transmitted, and transmits captured image data that has been reduced in volume due to the division. The transmission control unit 2165 makes the compression rate of the captured image data higher or decimates the captured image data for a prescribed time before the timing at which the text data is transmitted. The volume of the captured image data may be reduced in this way.

Furthermore, the transmission control unit 2165 may stop the transmission of captured image data for a prescribed time before the timing at which the transmission of text data is started. For example, the transmission control unit 2165 stops the transmission of captured image data at a time that precedes the timing at which the transmission of text data is started by at least the time necessary from the start of transmission to the completion of transmission of the captured image data. Thus, the transmission control unit 2165 stops the transmission of the captured image data for the timing by which text data is to be transmitted. As a result thereof, for the timing at which the text data is to be transmitted, it is possible to prevent the occurrence of a situation in which text data cannot be transmitted because captured image data is being transmitted.

[Action Flow Chart of Flying Device 21]

Figure 11:
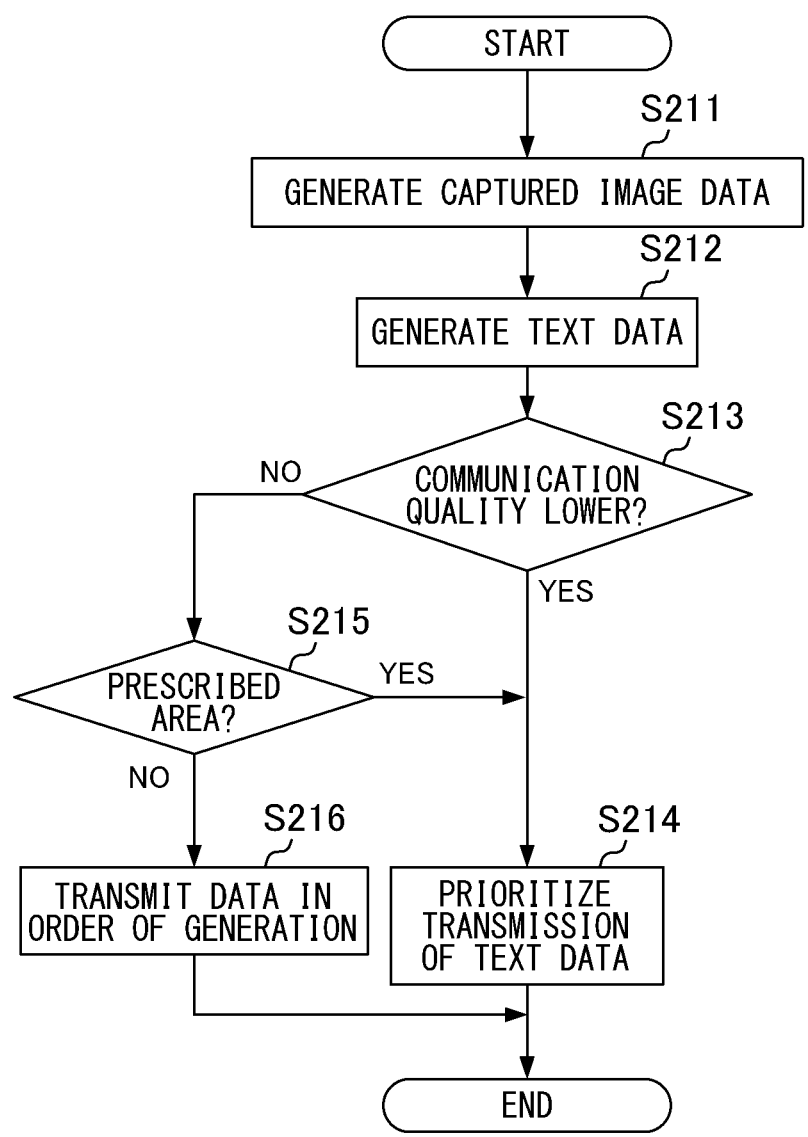
FIG. 11 is a flow chart for explaining the actions performed by the flying device according to the fourth embodiment.

FIG. 11 is a flow chart for explaining the actions performed by the flying device 21 according to the fourth embodiment. In the flying device 21, the captured image data generation unit 2164 generates captured image data (S211) and the text data generation unit 2163 generates text data (S212). Although the relationship between the timing at which the captured image data generation unit 2164 generates captured image data and the timing at which the text data generation unit 2163 generates text data may be chosen arbitrarily, in the present example, the captured image data is generated earlier than the text data.

The transmission control unit 2165 periodically monitors the communication quality of the wireless communication channel W211 (S213). When the transmission control unit 2165 assesses that the communication quality has lowered to a prescribed threshold value or less (YES in S213), priority control is executed and the transmission of text data is prioritized over the transmission of the captured image data (S214).

If it is assessed, in step S213, that the communication quality is not degraded (NO in step S213), then the transmission control unit 2165 assesses whether or not the flying device 21 is flying in a prescribed area in which it is highly important to fly safely, such as an urban area (S215). If it is assessed that the flying device 21 is flying in a prescribed area (YES in S215), then the procedure advances to step S214 and priority control is executed (S214).

On the other hand, if it is assessed, in step S215, that the flying device 21 is not flying in a prescribed area (NO in S215), then the transmission control unit 2165 transmits data in the order in which it is generated (S216). That is, in the example shown in FIG. 11, the transmission control unit 2165 transmits the text data generated by the text data generation unit 2163 in step S212 after the captured image data generated by the captured image data generation unit 2164 in step S211 has been transmitted.

[Advantageous Effects of Flying Device 21 of Fourth Embodiment]

When the flying device 21 transmits image data and control data, there are cases in which control data cannot be transmitted while large-volume captured image data is being transmitted, causing a delay until the control data is transmitted to the control device 22. If the transmission of control data is delayed, there are cases in which it becomes difficult to quickly control the flying device 21 in response to the state thereof, thereby reducing the flight performance of the flying device 21.

As explained above, in the flying device 21, when the condition for executing priority control is satisfied, the transmission of text data to the control device 22 is prioritized over the transmission of the captured image data. The text data includes flight information relating to the position, orientation, speed and the like of the flying device 21 used to control the flying device 21 in the control device 22. By providing this feature, the probability that flight information used to control the flying device 21 reaches the control device 22 is increased, while also reducing the delay time until the flight information reaches the control device 22. As a result thereof, the user can control the flying device 21 while referring to flight information that aids in control. For this reason, the flying device 21 can improve the flight safety. In this way, it is possible to prevent lower flight performance when data other than control data is transmitted between the flying device 21 and the control device 22.

The transmission control unit 2165, for example, prioritizes the transmission of text data when the communication quality of the wireless communication channel W211 becomes lower. By doing so, the probability that text data that is important for ensuring flight safety reaches the control device 22 can be increased even when the effective transmission rate on the wireless communication channel W211 becomes lower.

Additionally, the transmission control unit 2165 prioritizes the transmission of text data when the position at which the flying device 21 is flying is in an area in which the safety requirement level is high. By providing this feature, the probability that text data including information that is important for flight control will quickly reach the control device 22 is raised in areas in which crash accidents cannot be allowed. For this reason, it is possible to improve the flight safety in areas in which safety is required.

Modified Example 1

When there are no tall buildings or other flying devices in the environs and there is no no-fly zone in the vicinity, the controlling user does not need to carefully operate the flying device 21 while watching captured images captured by the camera. Therefore, in such a case, the transmission control unit 2165 may prioritize the transmission of text data including position information indicating the flight position without transmitting captured image data so that the flight position is shown on a map at the control device 22.

Additionally, the transmission control unit 2165 may switch between a first mode in which the transmission of text data is prioritized in accordance with conditions in the environs and a second mode in which the transmission of text data is not prioritized. For example, the transmission control unit 2165 may switch to a second mode for transmitting captured image data when it is detected that there are tall buildings or other flying devices in the environs during flight in the first mode.

Modified Example 2

The transmission control unit 2165 may switch whether or not to prioritize the transmission of text data on the basis of the remaining power in a battery that provides power for flying. When the remaining battery power becomes lower than a prescribed threshold value, the transmission control unit 2165 may, for example, prioritize the transmission of text data, which includes flight information, without repeatedly transmitting captured image data many times. When the remaining battery power becomes lower than the prescribed threshold value, the transmission control unit 2165 may transmit information indicating the flight position and the flight altitude as information that is particularly important within the flight information.

Fifth Embodiment

In the fourth embodiment, the flying device transmits and receives data to and from the control device 22 via the wireless communication channel W211, the base station 23 and the wireless communication channel W212. The fifth embodiment differs from the fourth embodiment in that the flying device 21 is able to transmit and receive data to and from the control device 22 via multiple wireless communication channels.

Figure 12:
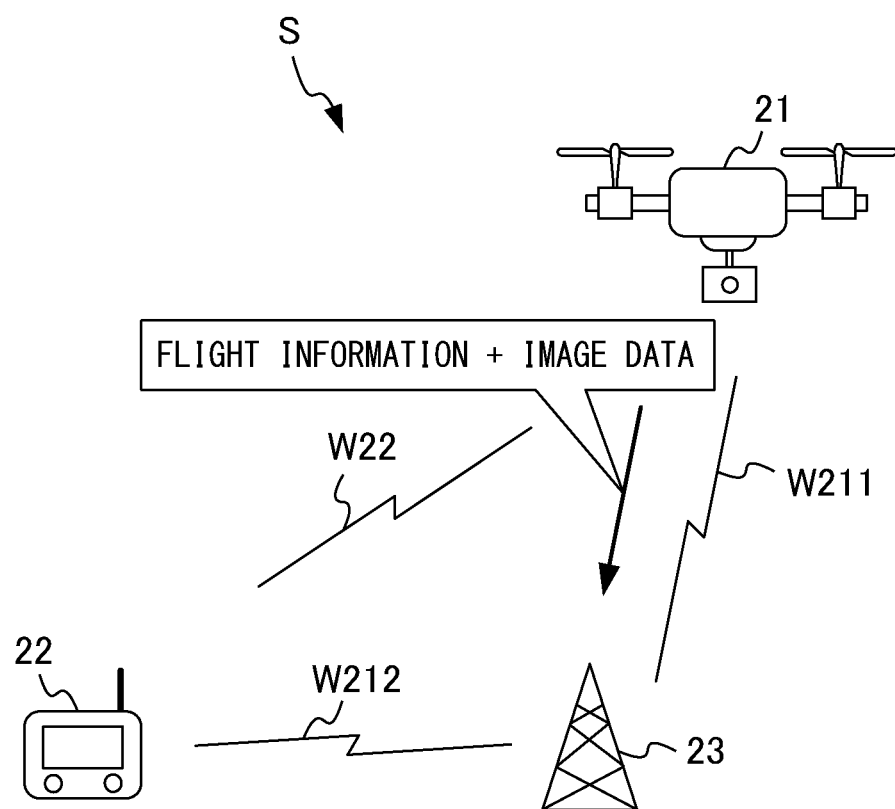
FIG. 12 is a diagram showing the structure of a flying system according to a fifth embodiment.

FIG. 12 is a diagram showing the structure of a flying system S according to a fifth embodiment. As shown in FIG. 12, the flying device 21 can directly transmit and receive data to and from the control device 22 via the wireless communication channel W212. The wireless communication channel W212 is a channel, for example, a Wi-Fi (registered trademark) channel through which data can be transmitted to the control device 22 without being mediated by a base station 23 in a mobile telephone network.

Figure 13:
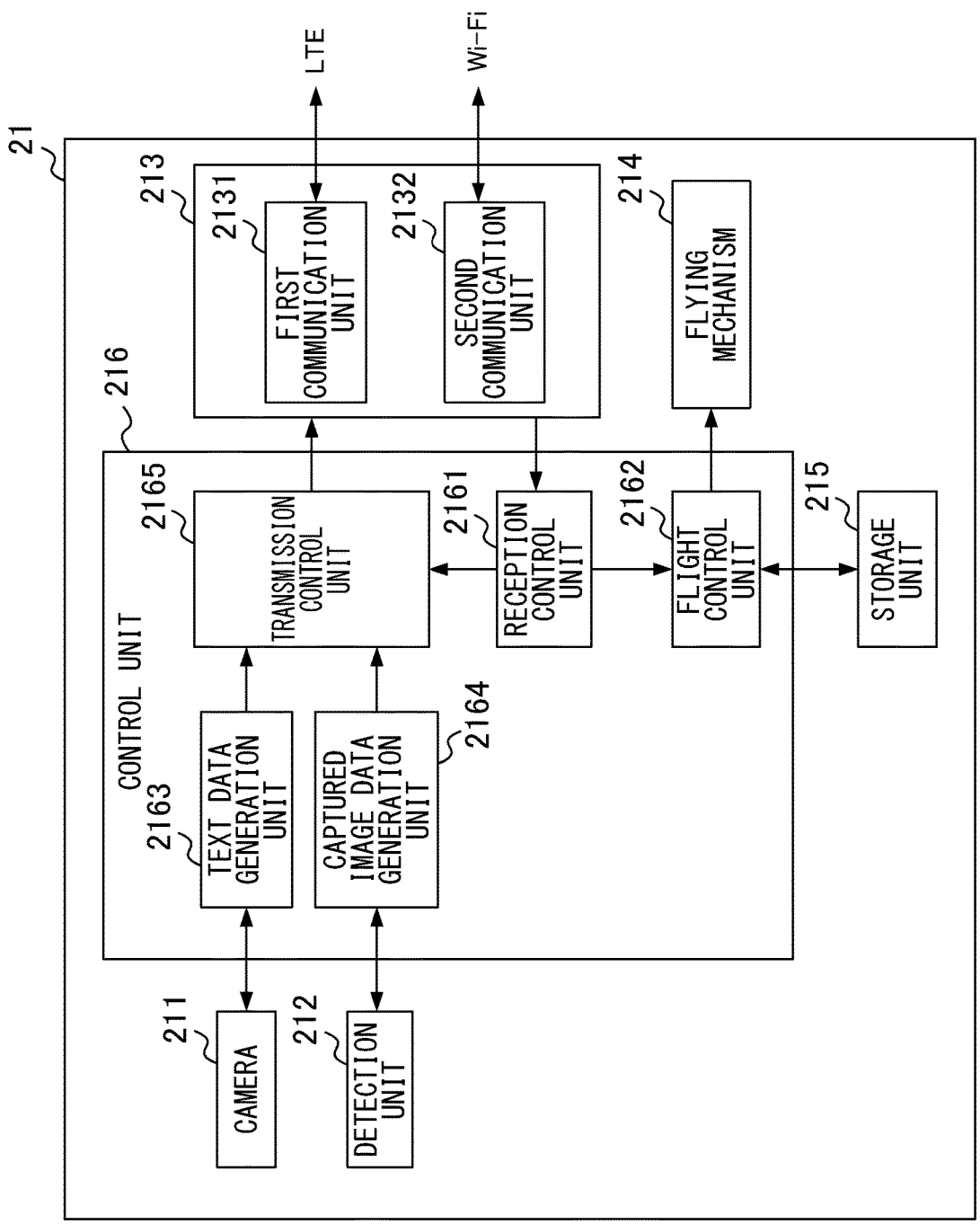
FIG. 13 is a diagram showing the structure of a flying device according to the fifth embodiment.

FIG. 13 is a diagram showing the structure of the flying device according to the fifth embodiment. The flying device 21 shown in FIG. 13 differs from the flying device 21 shown in FIG. 10 in that the communication unit 213 has a first communication unit 2131 and a second communication unit 2132, and is otherwise the same. The first communication unit 2131 has an LTE channel communication module and the second communication unit 2132 has a Wi-Fi channel communication module.

The transmission control unit 2165 transmits text data using the wireless communication channel in which the propagation delay time is smaller among the wireless communication channel W211 (first wireless communication channel) and the wireless communication channel W212 (second wireless communication channel). Additionally, the transmission control unit 2165 transmits captured image data using the wireless communication channel in which the propagation delay time is larger among the wireless communication channel W211 and the wireless communication channel W212. By doing so, the transmission control unit 2165 is able to transmit important text data, such as flight information, to the control device 22 with as little delay as possible. The transmission control unit 2165 may transmit the captured image data by using the wireless communication channel W212 on the condition that the communication quality of the wireless communication channel W211 has become lower.

Additionally, the transmission control unit 2165 may transmit text data using radio signals that are stronger among first radio signals on the wireless communication channel W211 and second radio signals on the wireless communication channel W212, and transmit captured image data using the radio signals that are weaker among the first radio signals and the second radio signals. By providing this feature, the transmission control unit 2165 is able to raise the probability that the text data will reach the control device 22 without errors.

Instead of using the strength of the first radio signals as actually measured, the transmission control unit 2165 may determine the strength of the first radio signals on the basis of radio signal state information indicating the strength distribution of the first radio signals acquired by the reception control unit 2161 functioning as an acquisition unit. The transmission control unit 2165 may set the radio signals on which the text data and the captured image data are to be transmitted on the basis of the strength of the first radio signals on the flight path determined by the radio signal state information and the strength of the second radio signals as measured. The transmission control unit 2165, for example, may determine the strength of the first radio signals at a scheduled flight position at a scheduled time for transmitting the next text data on the basis of the radio signal state information.

Specifically, the transmission control unit 2165 determines, on the basis of the radio signal state information, the position to which text data is to be transmitted that is determined on the basis of the flight speed and the timing at which the text data is to be transmitted. Furthermore, the transmission control unit 2165 sets the radio signals to be used for transmitting captured image data while the text data is being transmitted, on the basis of the strength of the first radio signals at the determined position. When the strength of the first radio signals is high enough, the transmission control unit 2165 transmits the text data via the wireless communication channel W211 and also transmits the captured image data via the wireless communication channel W211. When the strength of the first radio signals is high enough to transmit the text data but not enough to simultaneously transmit the text data and the captured image data, the transmission control unit 2165 transmits the text data via the wireless communication channel W212. By providing this feature, when the strength of the first radio signals is low, it becomes unnecessary to transmit the text data and the captured image data in parallel using the same radio signals. Due to this feature, it is possible to more reliably transmit text data to the control device 22.

When the strength of first radio signals as determined is higher than the strength of second radio signals as actually measured, the transmission control unit 2165 transmits text data on the wireless communication channel W211 and transmits captured image data on the wireless communication channel W212. In contrast therewith, when the strength of the first radio signals as determined is equal to or lower than the strength of the second radio signals as actually measured, the transmission control unit 2165 transmits captured image data on the wireless communication channel W211 and transmits text data on the wireless communication channel W212. When the effective transmission speed on either the wireless communication channel W211 or the wireless communication channel W212 is in a state in which captured image data and text data can be transmitted simultaneously, the wireless communication channel having the sufficient effective transmission speed may be used to transmit the text data and the captured image data simultaneously.

[Advantageous Effects of Flying Device 21 of Fifth Embodiment]

As explained above, the flying device 21 of the fifth embodiment is able to transmit text data including flight information using the wireless communication channel W212 when the communication quality on the wireless communication channel W211 has become low. Additionally, the transmission control unit 2165 can transmit only text data using the wireless communication channel W211 and transmit the captured image data using the wireless communication channel W212. By having the transmission control unit 2165 use the wireless communication channel W211 and the wireless communication channel W212 in this way, text data such as flight information can be more reliably transmitted to the control device 22.

Summary of Sixth Embodiment

Figure 14:
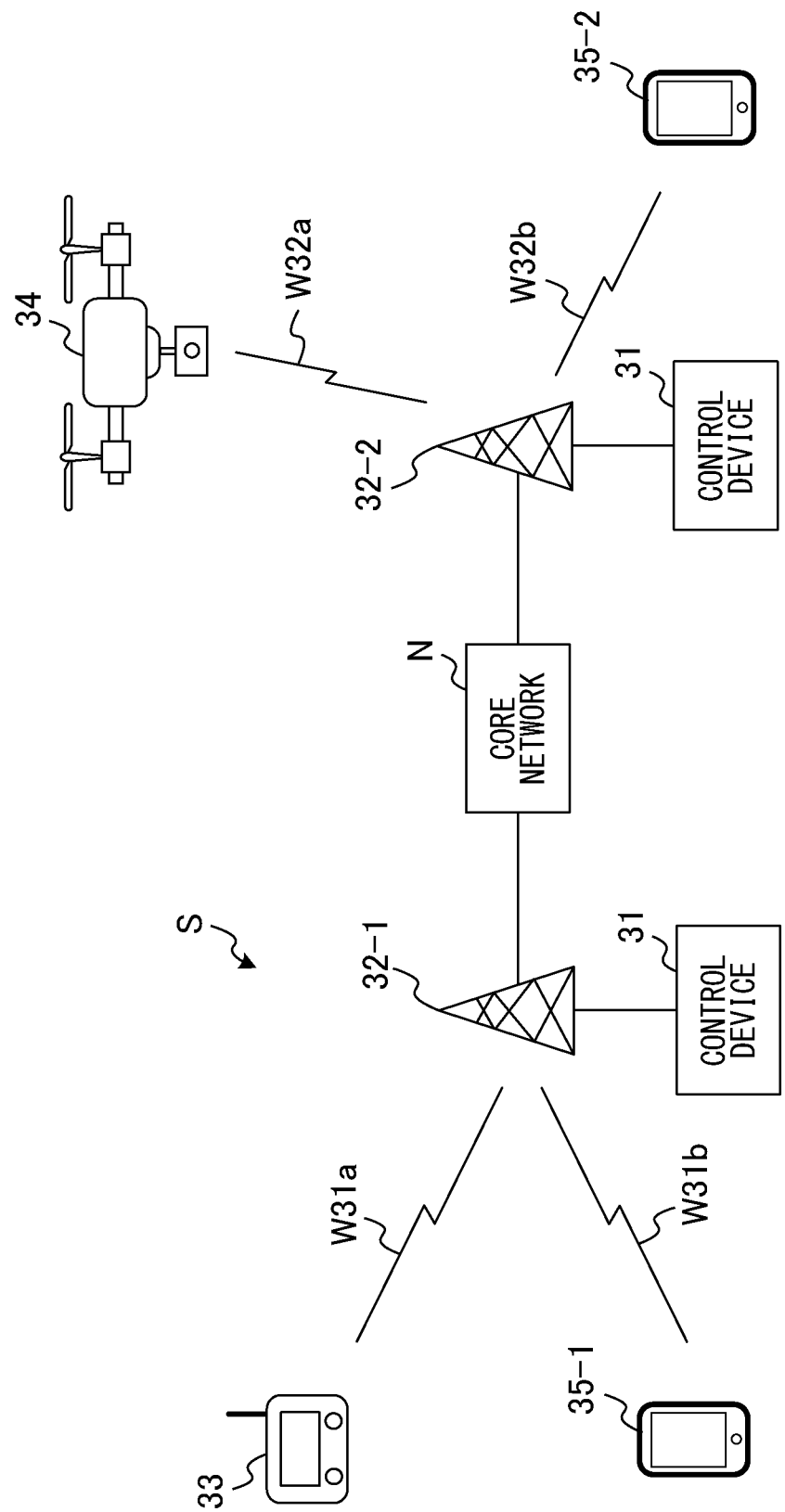
FIG. 14 is a diagram showing the structure of a communication system according to a sixth embodiment.

FIG. 14 is a diagram showing the structure of a communication system S according to the sixth embodiment. The communication system S comprises a control device 31 and a base station 32.

The control device 31 is, for example, a computer, that controls the allocation of wireless communication channels in a mobile telephone network. The control device 31 is connected to a base station 32 of the mobile telephone network and controls the wireless communication channel allocation processes in the base station 32. The control device 31 may be a device constituting a portion of the base station 32.

The base station 32 is, for example, an eNodeB of an LTE (Long Term Evolution) network, that allocates wireless communication channels to various types of communication terminals and exchanges data between communication terminals via wireless communication channels. The base station 32 (base station 32-1, base station 32-2) is connected via a core network N. In FIG. 14, a flight control device 33, a flying device 34 and an information communication terminal 35 are shown as examples of communication terminals.

The flying device 34 is, for example, a drone, that can be controlled by a user using the flight control device 33. The flight control device 33 is a terminal, such as a transmitter, a smartphone or a tablet, that can transmit control data for controlling the flying device 34 via a wireless communication channel. The information communication terminal 35 is, for example, a smartphone or a tablet.

When a user operates the flight control device 33, the flight control device 33 transmits, to the flying device 34, control data in accordance with the operation content. The flying device 34 performs flight control by using the control data. Flight control includes control of the flight direction and flight speed of the flying device 34, and specifically involves controlling propellers and rudders on the flying device 34. The flying device 34 transmits, to the control device 33, flight data that is necessary for control, such as the flight position and the flight speed. The flight data may, for example, be information relating to the position, altitude, speed, direction, orientation (tilt), wind speed and remaining battery level of the flying device 34. The flying device 34 has a camera and transmits image data captured and generated by the camera to the flight control device 33.

The flight control device 33 and the flying device 34 can transmit and receive control data, flight data and image data using a wireless communication channel W31a and a wireless communication channel W32a. The wireless communication channel W31a and the wireless communication channel W32a are, for example, LTE channels. The information communication terminal 35 can use the wireless communication channel W31b and the wireless communication channel W32b to transmit and receive various types of data.

In the communication system S, the control device 31 controls priority levels for allocating wireless resources on the basis of whether or not a communication terminal transmitting data to the base station 32 is a flying device 34. Wireless resources are resources, for example, radio frequency bands or radio channels, that are used by communication terminals to transmit data. When the data received via the wireless communication channel W31a or the wireless communication channel W32a is data transmitted by the flight control device 33 or the flying device 34, the control device 31 makes the priority level for allocating wireless resources higher than that for data transmitted by other communication terminals (for example, the information communication terminal 35).

Additionally, when the data type is flight data indicating the flight state of the flying device 34 or control data for controlling the flying device 34, the control device 31 makes the priority level higher. By providing this feature, the probability that data transmitted by the flight control device 33 or the flying device 34 will be transmitted without delays becomes higher, thereby improving the flight safety of the flying device 34.

Hereinbelow, the structure of the control device 31 will be explained in detail.

[Structure of Control Device 31]

Figure 15:
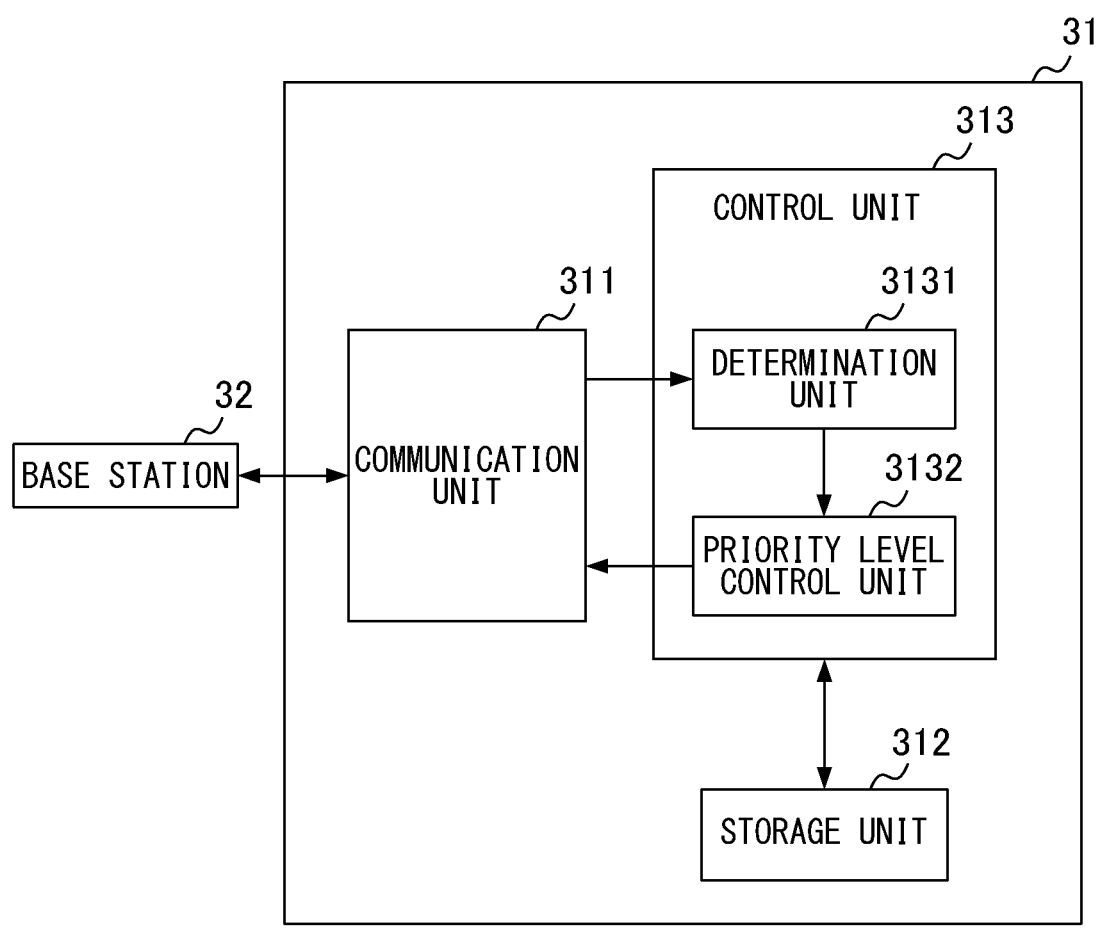
FIG. 15 is a diagram showing the structure of a control device according to the sixth embodiment.

FIG. 15 is a diagram showing the structure of the control device 31 according to the sixth embodiment. The control device 31 has a communication unit 311, a storage unit 312 and a control unit 313. The control unit 313 has a determination unit 3131 and a priority level control unit 3132.

The communication unit 311 is a communication interface for exchanging data with the base station 32. The communication unit 311 has, for example, a LAN (Local Area Network) controller.

The communication unit 311 functions as a reception unit and receives, from a communication terminal, a mobile telephone network wireless communication channel usage request, via the base station 32 of the mobile telephone network. The communication request includes terminal information relating to multiple communication terminals. The terminal information includes, for example, communication terminal identification information and information indicating a data type that is scheduled to be transmitted by the communication terminal. Additionally, the communication unit 311 receives electric field strength information indicating the electric field strength in the vicinity of the flying device 34. Furthermore, the communication unit 311 receives position information indicating the position of the flying device 34 and electric field strength distribution information indicating the strength distribution of radio signals used for transmitting data. The communication unit 311 notifies the determination unit 3131 of various types of information received from the base station 32.

The storage unit 312 is a storage medium including a ROM (Read Only Memory), a RAM (Random Access Memory) or the like. The storage unit 312 stores programs that are executed by the control unit 313. Additionally, the storage unit 312 is used as a work memory for the control unit 313.

The control unit 313 is, for example, a CPU (Central Processing Unit), and by executing the programs stored in the storage unit 312, functions as the determination unit 3131 and the priority level control unit 3132.

On the basis of terminal information included in a usage request received by the reception unit 311, the determination unit 3131 determines the type of communication terminal and the type of data transmitted by the communication terminal. The determination unit 3131, for example, determines whether the communication terminal is a flight control device 33 or a flying device 34, or whether it is another type of communication terminal. Additionally, if the communication terminal is a flight control device 33, the determination unit 3131 determines whether or not the data being transmitted by the flight control device 33 is control data for controlling the flying device 34. Additionally, if the communication terminal is a flying device 34, the determination unit 3131 determines whether or not the data being transmitted by the flying device 34 is flight data indicating the flight state of the flying device 34. The determination unit 331 notifies the priority level control unit 3132 of the determined results.

The determination unit 3131 may acquire identification information for at least one of the flight control device 33 and the flying device 34 from a user requesting permission to fly the flying device 34, and store the acquired identification information in the storage unit 312. When the communication unit 311 has received data, the determination unit 3131 may determine that the data type is flight data of the flying device 34 on the basis of a SIM (Subscriber Identity Module) card identifier of the transmission source or a telephone number registered for use by the flying device.

A diagram indicating the electric field strength distribution information would be similar to that in FIG. 5. FIG. 5 shows an area in which strength of the radio signals is high, an area in which strength of the radio signals is medium, and an area in which strength of the radio signals is low. Suppose that the position P1 in FIG. 5 is the current position of the flying device 34, and the flying device 34 is at a position at which strength of the radio signals is high. The arrow in FIG. 5 indicates the scheduled flight path of the flying device 34. According to FIG. 5, as the flying device 34 flies along the scheduled flight path, strength of the radio signals become lower, and at position P2, the flying device 34 enters an area in which strength of the radio signals is low.

If the type of communication terminal determined by the determination unit 3131 is a flying device 34 and the type of data is flight data indicating the flight state of the flying device 34, the priority level control unit 3132 makes the priority level for allocating wireless resources higher than the priority level for allocation of wireless resources in other cases. Similarly, if the type of communication terminal is a flight control device 33 and the type of data is control data for controlling the flying device 34, the priority level control unit 3132 makes the priority level for allocating wireless resources higher than the priority level for allocation of wireless resources in other cases.

Hereinbelow, the priority level control that is performed when the priority level control unit 3132 allocates resources will be explained in detail.

[Priority Level Control Method]
(Priority Level Control Based on Communication Quality of Wireless Channel)

If the priority level of wireless resources to be allocated is to be made high, the priority level control unit 3132 controls the base station 32 so as to allocate wireless channels, for example, having a high C/N (carrier-to-noise ratio) or S/N (signal-to-noise ratio), that can be expected to be able to secure relatively high communication quality. When the priority level is to be made high, the priority level control unit 3132 may allocate multiple wireless channels to the flight control device 33 or the flying device 34 with higher priority so that even if the communication quality of one of the wireless channels degrades, data can be transmitted and received on the other wireless channels.

In order to prioritize the allocation of wireless channels having good communication quality to the flying device 34, for example, on the basis of the radio signal conditions in the vicinity of the flying device 34, the priority level control unit 3132 allocates to the flying device 34, with higher priority, wireless channels for which the radio signal conditions in the vicinity of the flying device 34 are relatively better. Specifically, the priority level control unit 3132 periodically acquires, from the flying device 34, information indicating the electric field strength in the frequency bands of the wireless communication channels received by the determination unit 3131 via the communication unit 311, and sets the priority level on the basis of the acquired electric field strength information. The priority level control unit 3132, for example, prioritizes the allocation, to the flying device 34, of wireless channels corresponding to frequencies in which the electric field strength is low under conditions in which the base station 32 is not transmitting radio signals (in other words, frequencies with little interference noise). When it is detected that the conditions of the radio signals on a wireless channel allocated to the flying device 34 are poor, the priority level control unit 3132 re-allocates, to the flying device 34, a wireless channel in which the conditions of the radio signals are good, and makes the flying device 34 use the new wireless channel.

Additionally, the priority level control unit 3132 may set the priority level on the basis of electric field strength distribution information indicating the distribution of electric field strength according to the position and the altitude. In the electric field strength distribution information, for each of frequencies of multiple wireless channels used in the mobile telephone network, the position in three-dimensional space and the electric field strength in the state in which radio signals are not being transmitted by the base station 32 are associated.

The priority level control unit 3132 determines the electric field strength in the vicinity of the flying device 34 on the basis of the electric field strength distribution information and the position of the flying device 34 indicated by position information received by the determination unit 3131. The priority level control unit 3132 prioritizes the allocation, to the flying device 34, of wireless channels corresponding to frequencies in which the electric field strength is low under conditions in which radio signals are not being transmitted by the base station 32 at the flight position of the flying device 34. By providing this feature, it becomes possible to allocate, to the flying device 34, wireless channels at frequencies not susceptible to the influence of interference noise when interference noise is steadily generated at the flight position of the flying device 34.

The priority level control unit 3132 may set the priority level on the basis of the scheduled flight path of the flying device 34 and the electric field strength on the scheduled flight path determined on the basis of the electric field strength distribution information. The priority level control unit 3132, for example, acquires the scheduled flight path from the flight control device 33 or the flying device 34 via the determination unit 3131. The priority level control unit 3132 refers to the electric field strength distribution information to determine the electric field strength corresponding to positions on the scheduled flight path. The priority level control unit 3132 prioritizes the allocation, to the flying device 34, of wireless channels corresponding to frequencies in which the electric field strength is low at the positions on the scheduled flight path.

If it is predicted that, when flight is continued along the scheduled flight path, interference noise will increase on the wireless channel allocated to the flying device 34, thereby reducing the communication quality, the priority level control unit 3132 may transmit warning information to the flying device 34. For example, the priority level control unit 3132 may transmit warning information recommending that the wireless channel be switched to a different channel, or warning information recommending that the flight path be changed. When a request to change the wireless channel is received from the flying device 34, the priority level control unit 3132 prioritizes the allocation, to the flying device 34, of wireless channels that are expected to be of high communication quality on the scheduled flight path.

The priority level control unit 3132 may estimate the scheduled flight path of the flying device on the basis of the flight position of the flying device 34 and the flight speed of the flying device 34. The priority level control unit 3132 may further estimate the scheduled flight path on the basis of the flight direction of the flying device 34.

Additionally, the interference noise generation conditions can be expected to change with the passage of time. Therefore, the priority level control unit 3132 may collect electric field strength information actually measured at various positions and altitudes by many flying devices 34, and may update the electric field strength distribution information on the basis of the collected information. The priority level control unit 3132, for example, stores radio signal strength distribution information in the storage unit 312, for example, in association with the time, the day of the week or the weather. By using electric field strength distribution information reflecting the latest state of the electric field strength, the priority level distribution unit 3132 is able to improve the electric field strength estimation precision on the flight path and more appropriately set the priority level.

The priority level control unit 3132 may determine the reason for a strong electric field on the basis of whether or not the base station 32 was transmitting radio signals during a time at which many flying devices 34 measured the electric field strength, in order to improve the precision for identifying wireless channels that are little affected by interference noise. The priority level control unit 3132, for example, generates electric field strength distribution information using electric field strengths measured at a timing when the base station 32 is not transmitting radio signals. As a result thereof, it is possible to improve the precision by which high-quality wireless channels that are little affected by interference noise can be identified.

The priority level control unit 3132 may control multiple base stations 32. In this case, the priority level control unit 3132 makes the base station 32 including the scheduled flight path in the communication area thereof allocate wireless resources to the flying device 34 on the basis of the priority level. For example, the priority level control unit 3132 instructs the base station 32 including the scheduled flight path in the communication area thereof not to use wireless channels in which the communication quality is relatively high for terminals other than flying devices 34, so that a wireless channel with high communication quality can be allocated as soon as a flying device 34 enters the communication area of the base station 32. By providing this feature, the flying device 34 can continue to carry out satisfactory communication even when the base station 32 that is the communication target is switched.

(Priority Level Control Based on Attributes of Flying Device 34)

In the flying device 34, the required safety differs depending on the purpose of flying. Therefore, the required level of communication quality between the flight control device 33 and the flying device 34 differs in accordance with the purpose of flying. Thus, the priority level control unit 3132 may acquire the attributes of the flying device 34 from the flight control device 33 or the flying device 34, and control the priority level on the basis of the acquired attributes.

The attributes of the flying device 34 are, for example, the name of a company managing the flying device 34 or the flight purpose of the flying device 34. If the attributes of the flying device 34 indicate that it is owned by a company (for example, a transport company or a home delivery company) that has subscribed to a service for priority allocation of wireless channels, the priority level control unit 3132 makes the priority level higher. Additionally, if the attributes of the flying device 34 indicate that the flight purpose is for transporting objects, the priority level is made higher in order to prevent accidents due to the objects being dropped.

(Priority Level Control Based on Application Used by Flying Device 34)

In the flying device 34, the communication quality required in the wireless communication channel differs in accordance with the application software that to be executed. For example, if the flying device 34 is running application software for creating high-compression moving images and high-compression moving image data is created on the basis of images captured by the camera, real-time error-free transmission of the created moving image data is required.

Therefore, the priority level control unit 3132 sets the priority level on the basis of the type of application software used by the flying device 34. Specifically, the priority level control unit 3132 acquires, from the flight control device 33 or the flying device 34, information regarding the type of application software being run by the flying device 34. Additionally, the priority level control unit 3132 makes the priority level higher when the application software being run by the flying device 34 is application software that is pre-registered as application software requiring high communication quality.

(Priority Level Control Based on Flight Speed)

As the flight speed of the flying device 34 becomes faster, the distance that is covered in a unit period of time becomes greater. Therefore, as the flight speed of the flying device 34 becomes faster, the impact is greater in cases in which the transmission of control information transmitted by the flight control device 33 is delayed or cases in which control information does not reach the flying device 34. Therefore, the priority level control unit 3132 may acquire information indicating the flight speed from the flying device 34 and set the priority level on the basis of the flight speed of the flying device 34. Specifically, as the flight speed becomes faster, the priority level control unit 3132 may implement control so as to allocate a wireless channel having high communication quality.

[Action Flow Chart of Control Device 31]

Figure 16:
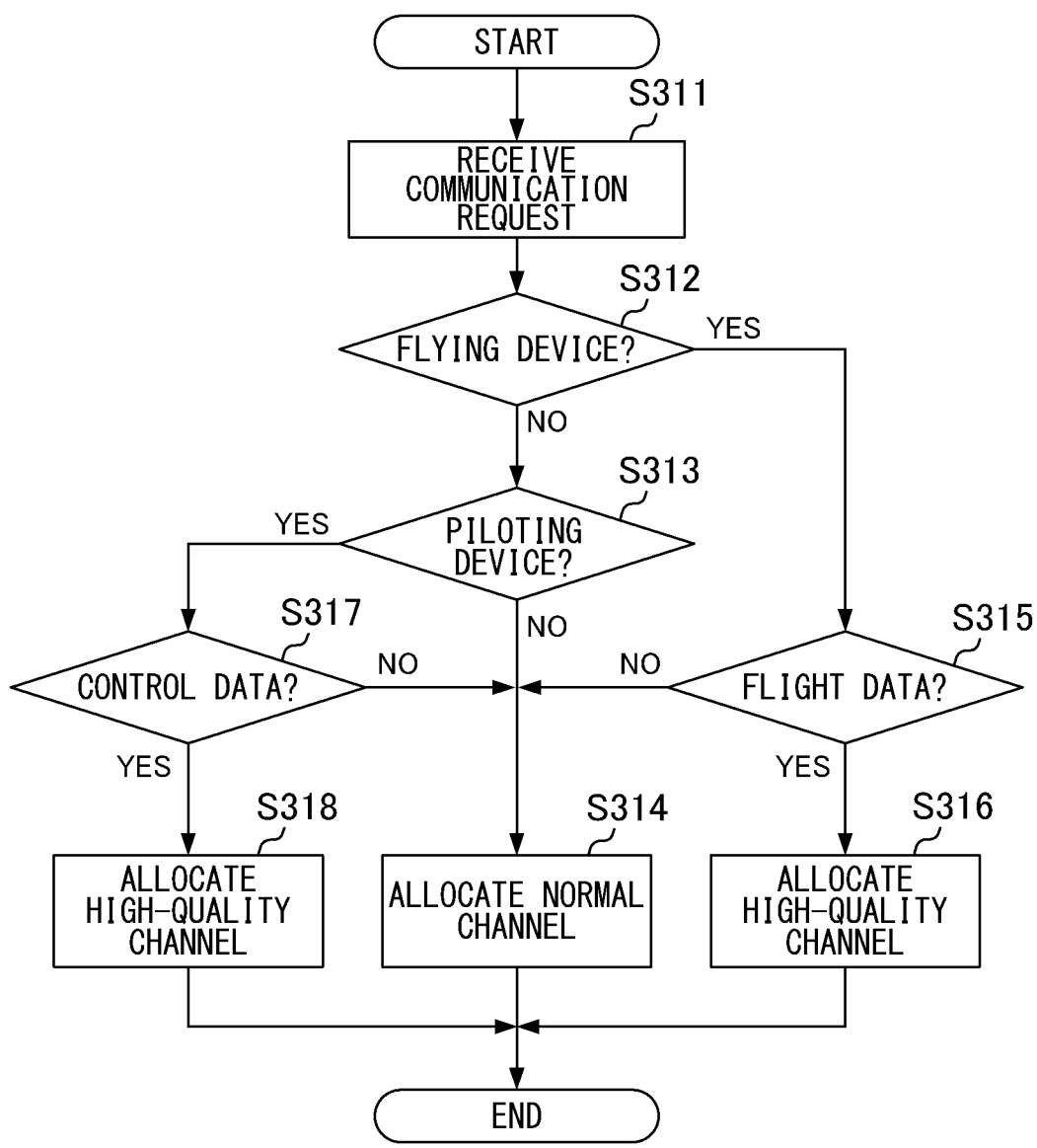
FIG. 16 is a flow chart for explaining the actions performed by the control device according to the sixth embodiment.

FIG. 16 is a flow chart for explaining the actions performed by the control device 31 according to the sixth embodiment.

First, the control device 31 receives, via the base station 32, a request to start communication from the communication terminal (communication request) (S311).

The priority level control unit 3132 assesses whether or not the communication terminal that transmitted the communication request is a flying device 34 (S312). If it is assessed that the communication terminal that transmitted the communication request is not a flying device 34 (NO in S312), the priority level control unit 3132 determines whether or not the communication terminal that transmitted the communication request is a flight control device 33 (S313). If it is assessed that the communication terminal that transmitted the communication request is not a flight control device 33 and a flying device 34 (NO in S313), the priority level control unit 3132 allocates a normal wireless channel, i.e., a wireless channel that has not been reserved as a high-quality wireless channel (S314).

If it is assessed, in step S312, that the communication terminal that transmitted the communication request is a flying device 34 (YES in S312), the priority level control unit 3132 assesses whether or not the data being transmitted by the flying device 34 is flight data (S315), and if it is assessed as being flight data, the priority level control unit 3132 allocates a high-quality wireless channel (S316). If it is assessed that the data being transmitted by the flying device 34 is not flight data, but rather low-priority data such as image data captured by a camera, the priority level control unit 3132 advances to step S314 and allocates a normal wireless channel.

If it is assessed, in step S313, that the communication terminal that transmitted the communication request is a flight control device 33 (YES in S313), the priority level control unit 3132 assesses whether or not the data transmitted by the flight control device 33 is control data (S317), and if it is assessed as being control data, the priority level control unit 3132 allocates a high-quality wireless channel (S318). If it is assessed that the data being transmitted by the flight control device 33 is not control data, the priority level control unit 3132 advances to step S314 and allocates a normal wireless channel.

[Advantageous Effects of Control Device 31]

When a user is controlling a flying device 34 at a position that cannot be directly reached by radio signals for controlling the flying device 34 generated by the flight control device 33, the flight control device 33 exchanges various types of control data with the flying device 34 via a public communication network. However, in a public communication network, large amounts of data transmitted from various communication terminals are transferred. For this reason, there are cases in which the transmission of control data is delayed during hours of the day in which there is heavy traffic. If the transmission of control data for controlling the flying device 34 is delayed, there are cases in which it becomes difficult to quickly control the flying device 34 in accordance with the state thereof, thereby reducing the flight performance of the flying device 34.

As explained above, the priority level control unit 3132 in the control device 31, upon receiving a request to use a wireless communication channel of a mobile telephone network from a communication terminal, determines the priority level for allocation of wireless resources on the basis of the type of communication terminal and the type of data that the communication terminal is attempting to transmit.

Furthermore, if the communication terminal type is a flying device 34 and the data type is flight data, the priority level control unit 3132 makes the priority level for allocating wireless resources higher than that for other cases.

Similarly, if the communication terminal type is a flight control device 33 and the data type is control data for controlling a flying device 34, the priority level control unit 3132 makes the priority level for allocating wireless resources higher. By providing this feature, it is possible to reduce transmission delays of data transmitted and received to and from the flying device 34 and the flight control device 33. Since the mobile telephone network is able to transmit data affecting flight control of the flying device 34 without delays, it becomes possible to improve the flight safety of the flying device 34.

Additionally, the priority level control unit 3132 sets the priority level on the basis of the electric field strength in the vicinity of the flying device 34. By providing this feature, it becomes possible to prioritize the allocation of wireless channels appropriate for the radio signal environment at the flight position of the flying device 34.

Furthermore, the priority level control unit 3132 may determine the electric field strength in the vicinity of the flying device 34 on the basis of electric field strength distribution information indicating the distribution of the electric field strength in accordance with the position and the altitude, and the position of the flying device 34. By providing this feature, a wireless channel that is appropriate for the flying device 34 can be allocated even when the flying device 34 cannot measure the electric field strength. Additionally, the priority level control unit 3132 can predict the electric field strength at a position at which the flying device 34 is scheduled to fly by using the electric field strength distribution information. For this reason, it is possible to allocate a wireless channel having high communication quality on the scheduled flight path of the flying device 34.

Additionally, the priority level control unit 3132 makes, on the basis of the scheduled flight path of the flying device 34, a base station 32 whose the scheduled flight path is included in a communication area therein prioritize the allocation of wireless resources to the flying device 34. By providing this feature, wireless channels having high communication quality can be continuously used even when the flying device 34 moves between cells of base stations 32.

Summary of Seventh Embodiment

Figure 17:
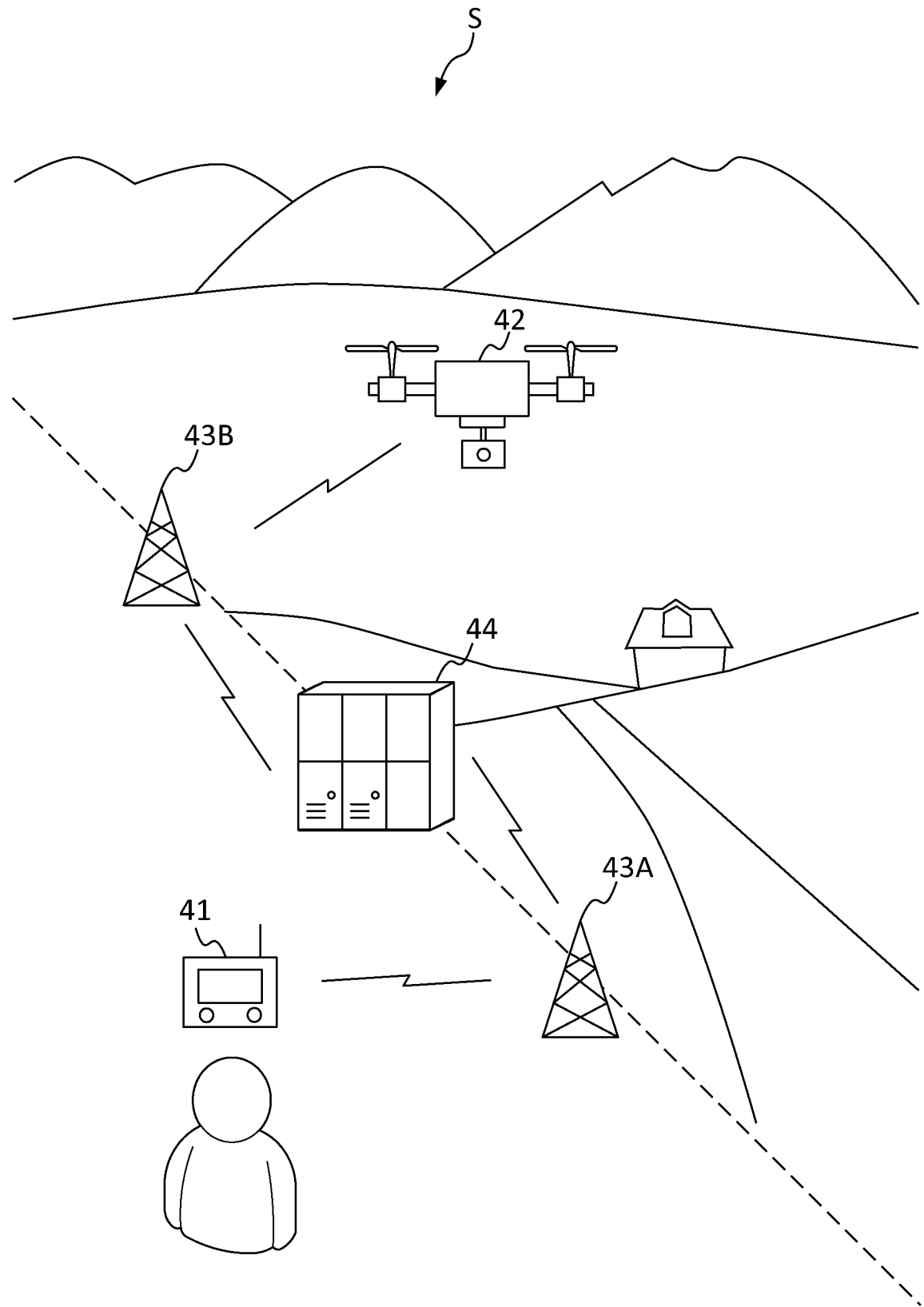
FIG. 17 is a diagram showing the structure of a flight control system according to a seventh embodiment.

FIG. 17 is a diagram showing the structure of a flight control system S according to the seventh embodiment. The flight control system S comprises a control device 41, a flying device 42, a base station 43A and a base station 43B of a mobile telephone network, and a core NW server 44 of the mobile telephone network. The flying device 42 is, for example, a drone, that can be controlled by a user using the control device 41. The flying device 42 is able to communicate with the control device 41 by connecting to the mobile telephone network via the base station 43B in the mobile telephone network. The control device 41 is a terminal, such as a transmitter, a smartphone or a tablet, that can transmit control information for controlling the flying device 42 via a wireless communication channel for use by mobile telephones (hereinafter referred to as a mobile telephone network). The control device 41 is able to communicate with the flying device 42 by connecting to the mobile telephone network via the base station 43A in the mobile telephone network. The user of the control device 41 can remotely control the flying device 42 while being at a location from which the flying device 42 cannot be seen, by using the control device 41 to transmit control information via the mobile telephone network.

When a user operates the control device 41, the control device 41 transmits, to the flying device 42, control information in accordance with the operation content. The flying device 42 transmits, to the control device 41, machine information that is necessary for control, such as the flight position and the flight speed. Additionally, the flying device 42 has a camera and transmits, to the control device 41, captured image data captured and generated by the camera.

The control device 41 and the flying device 42 can use the mobile telephone network to transmit and receive control information, instruction information, machine information and image data. The control device 41 and the flying device 42 communicate by using the mobile telephone network over which information can be transmitted and received via the mobile telephone network base station 43. The mobile telephone network is, for example, an LTE channel network constructed from core NW servers. A core NW server has, for example, a database (IPDB) for managing telephone numbers and IP addresses associated with the telephone numbers, and a session construction server for constructing communication sessions.

In the flight control system S, the control device 41 and the flying device 42 can transmit and receive information using a voice communication session or a data communication session established on the mobile telephone network. The voice communication session is a communication session that is used for making calls between mobile telephones, and for example, may be a communication session using VoLTE (Voice over LTE). A VoLTE channel ha a QoS (Quality of Service) control mechanism, and QoS parameters are provided with nine priority levels depending on the delay tolerance time and the presence or absence of bandwidth control. Under the QoS parameters for VoLTE, the delay tolerance value is 100 ms and the communication is bandwidth-guaranteed.

For example, the control device 41 transmits control information to the flying device 42 via a VoLTE voice communication session. The flying device 42 receives control information via the VoLTE voice communication session. The flying device 42 implements flight control using the received control information. Flight control includes control of the flight direction and flight speed of the control device 41, and specifically involves controlling propellers and rudders that the control device 41 has.

As mentioned above, in the flight control system S, the control device 41 and the flying device 42 transmit and receive information using a voice communication session in which the delay tolerance value is 100 ms and the bandwidth is guaranteed. By providing this feature, even if the data communication delay time becomes long, for example, due to increased traffic on the mobile telephone network, it is possible to prevent the delay time from becoming longer for cases in which control information is transmitted from the control device 41 to the flying device 42.

Hereinbelow, the structures of the control device 41 and the flying device 42 will be explained in detail.

[Structure of Control Device 41]

Figure 18:
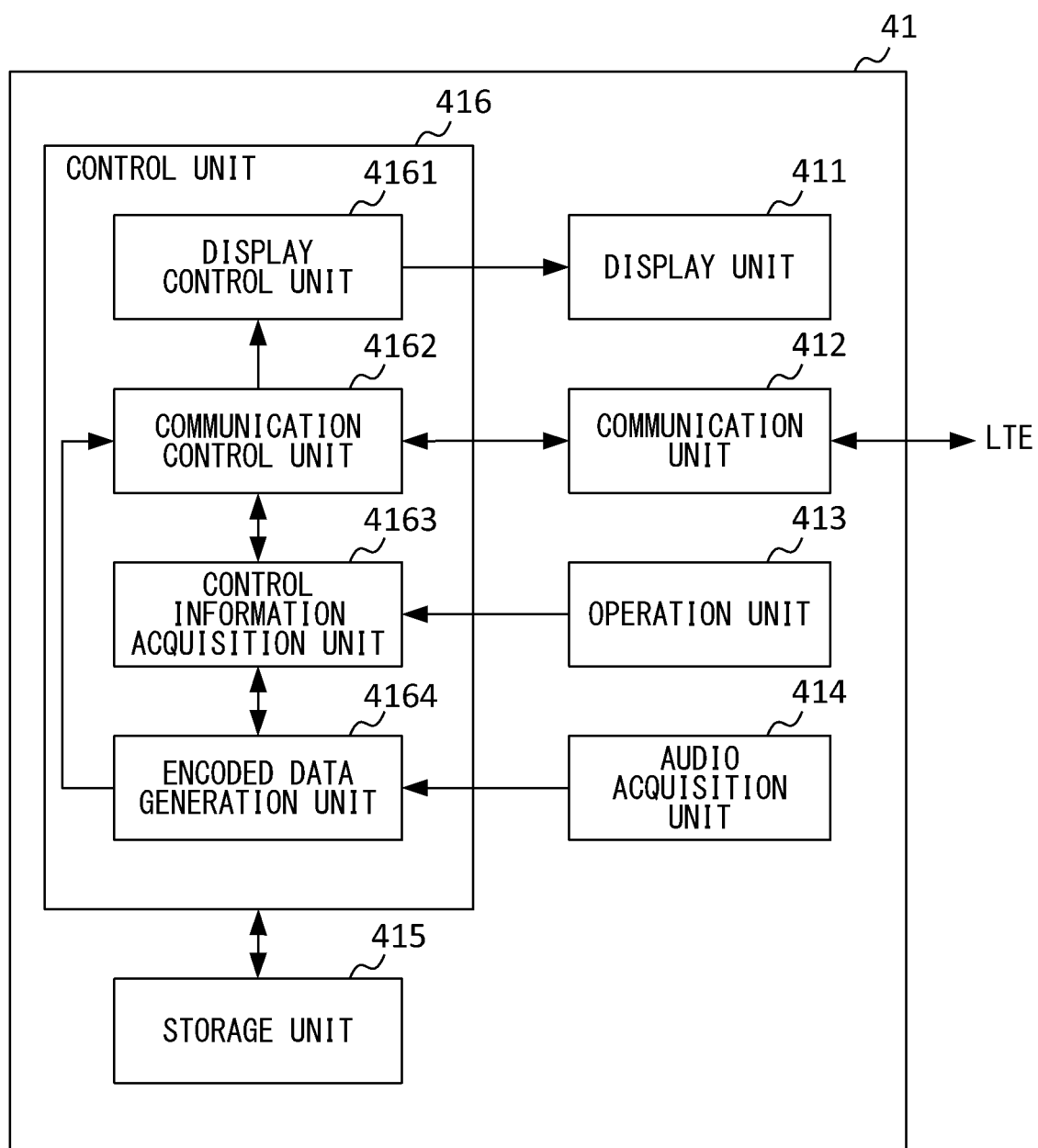
FIG. 18 is a diagram showing the structure of a control device according to the seventh embodiment.

FIG. 18 is a diagram showing the structure of the control device 41 according to the seventh embodiment. The control device 41 has a display unit 411, a communication unit 412, an operation unit 413, an audio acquisition unit 414, a storage unit 415 and a control unit 416. The control unit 416 has a display control unit 4161, a communication control unit 4162, a control information acquisition unit 4163 and an encoded data generation unit 4164.

The display unit 411 is a display for displaying information necessary for a user to control the flying device 42. The display unit 411 displays display data that is inputted from the display control unit 4161.

The communication unit 412 is a communication module that transmits and receives radio signals for communicating by using the mobile telephone network. The communication unit 412 has a modulator for modulating transmission data that is input from the communication control unit 4162, and an RF unit for transmitting the modulated data as an RF signal in a frequency band that is allocated to LTE. Additionally, the communication unit 412 has a demodulator for demodulating RF signals that the RF unit has received from the flying device 42. The demodulator transmits the demodulated reception data to the communication control unit 4162.

The operation unit 413 is a device for a user to perform operations for controlling the flying device 42, and for example, includes joysticks or volume controls for controlling the flight direction and flight speed. The operation unit 413 may further include a touch panel provided on the surface of the display unit 411. The operation unit 413 transmits, to the control information acquisition unit 4163, signals in accordance with the user's operations.

The audio acquisition unit 414 is an audio acquisition means for acquiring the user's voice. The audio acquisition unit 414 includes, for example, a microphone. The audio acquisition unit 414 transmits the user's voice that has been acquired to the encoded data generation unit 4164.

The storage unit 415 is a storage medium including a ROM (Read Only Memory), a RAM (Random Access Memory) or the like. The storage unit 415 stores programs that are executed by the control unit 416. Additionally, the storage unit 415 is used as a work memory for the control unit 416, and for example, temporarily stores machine information or captured image data received from the flying device 42.

The control unit 416 is, for example, a CPU (Central Processing Unit) that executes the programs stored in the storage unit 415 and thereby functions as the display control unit 4161, the communication control unit 4162, the control information acquisition unit 4163 and the encoded data generation unit 4164.

The display control unit 4161 generates display data to be displayed on the display unit 411. The display control unit 4161 displays the display data on the display unit 411 by transmitting generated display data to the display unit 411. The display control unit 4161, for example, makes the display unit 411 display the display data based on the operations of a user received via the control information acquisition unit 4163. Additionally, the display control unit 4161 makes the display unit 411 display the display data based on the machine information or captured image data from the flying device 42 received via the communication control unit 4162.

The communication control unit 4162 calls a mobile telephone network base station 43A using a telephone number corresponding to the flying device 42, and after a voice communication session with the flying device 42 is established, uses the voice communication session to transmit control information. Additionally, the communication control unit 4162 receives a transmission destination address corresponding to the telephone number via the mobile telephone network base station 43A. After a data communication session with the flying device 42 corresponding to the transmission destination address is established, the communication control unit 4162 uses the data communication session to transmit instruction information, including instructions to the flying device 42, different from the control information. The communication control unit 4162, for example, uses the data communication session to transmit instruction information instructing the flying device 42 to capture images.

The communication control unit 4162 receives machine information transmitted by the flying device 42 via the voice communication session. The machine information may, for example, be information relating to the position, altitude, speed, direction, orientation (tilt), wind speed, communication quality and remaining battery level of the flying device 42. Additionally, the communication quality includes, for example, a radio signal strength, a communication delay time, a number of retransmissions and a data error rate, detected by the flying device 42.

Additionally, the communication control unit 4162 can receive machine information transmitted from the flying device 42 via the data communication session. The communication control unit 4162 detects the congestion level on the mobile telephone network on the basis of the communication quality received by the flying device 42. The communication control unit 4162 determines, on the basis of the congestion level, whether to receive the machine information via the voice communication session or to receive the machine information via the data communication session. In this way, the communication control unit 4162 can receive the machine information via the voice communication session or the data communication session, so the communication session that is used can be switched depending on the congestion level on the mobile telephone network.

The communication control unit 4162 can switch the communication session that is being used on the basis of the speed of the flying device 42 or the wind speed at the flight position included in the machine information transmitted by the flying device 42. Specifically, the communication control unit 4162 receives machine information via the voice communication session when, for example, the flight speed of the flying device 42 is a prescribed value or higher. Additionally, the communication control unit 4162 receives machine information via the voice communication session when, for example, the wind speed at the flight position of the flying device 42 is a prescribed value or higher. By providing this feature, the user can accurately control the flying device 42 even in an environment in which quicker control is necessary.

The control information acquisition unit 4163 acquires control information for controlling the flying device 42 on the basis of signals indicating the operation content input from the operation unit 413. Additionally, the control information acquisition unit 4163 can, for example, acquire control information received by the communication control unit 4162 or control information stored in the storage unit 415. The control information acquisition unit 4163 notifies the display control unit 4161 of the acquired operation content.

The encoded data generation unit 4164 generates encoded control data by encoding control information as audio data in a frequency band outside the audible range, and generates encoded audio data by encoding audio acquired by the audio acquisition unit 414 as audio data in a frequency band within the audible range. The encoded data generation unit 4164 transmits the encoded audio data that has been generated to the communication control unit 4162. The communication control unit 4162 simultaneously transmits the encoded control data and the encoded audio data via the voice communication session.

Thus, the communication control unit 4162 of the control device 41 can transmit control information and audio using a voice communication session. For this reason, a user using the control device 41 can cause flying device 42 to output audio that was input to the control device 41, while controlling the flying device 42. Such features are suitable for cases in which a person is riding the flying device 42, or for cases in which the flying device 42 has a voice recognition function and can implement flight control on the basis of the recognized voice.

Additionally, such a structure can be utilized for a user A using the control device 41 to communicate with another user B near the flying device 42. Specifically, the user A can hear, via the control device 41, the voice of the user B near the flying device 42, acquired by the flying device 42. Additionally, the user A can allow a user B to hear the user A's own voice via the flying device 42. By providing this feature, the user A and the user B can hold a conversation even while at separate locations.

Additionally, the flying device 42 generates captured image data capturing images of the user B and the vicinity of the user B, and transmits the captured image data, together with audio, to the control device 41 used by the user A. The user A can see the user B and the vicinity of the user B via the control device 41. By providing this feature, the user A can hold a conversation while seeing the condition of user B.

[Structure of Flying Device 42]

Figure 19:
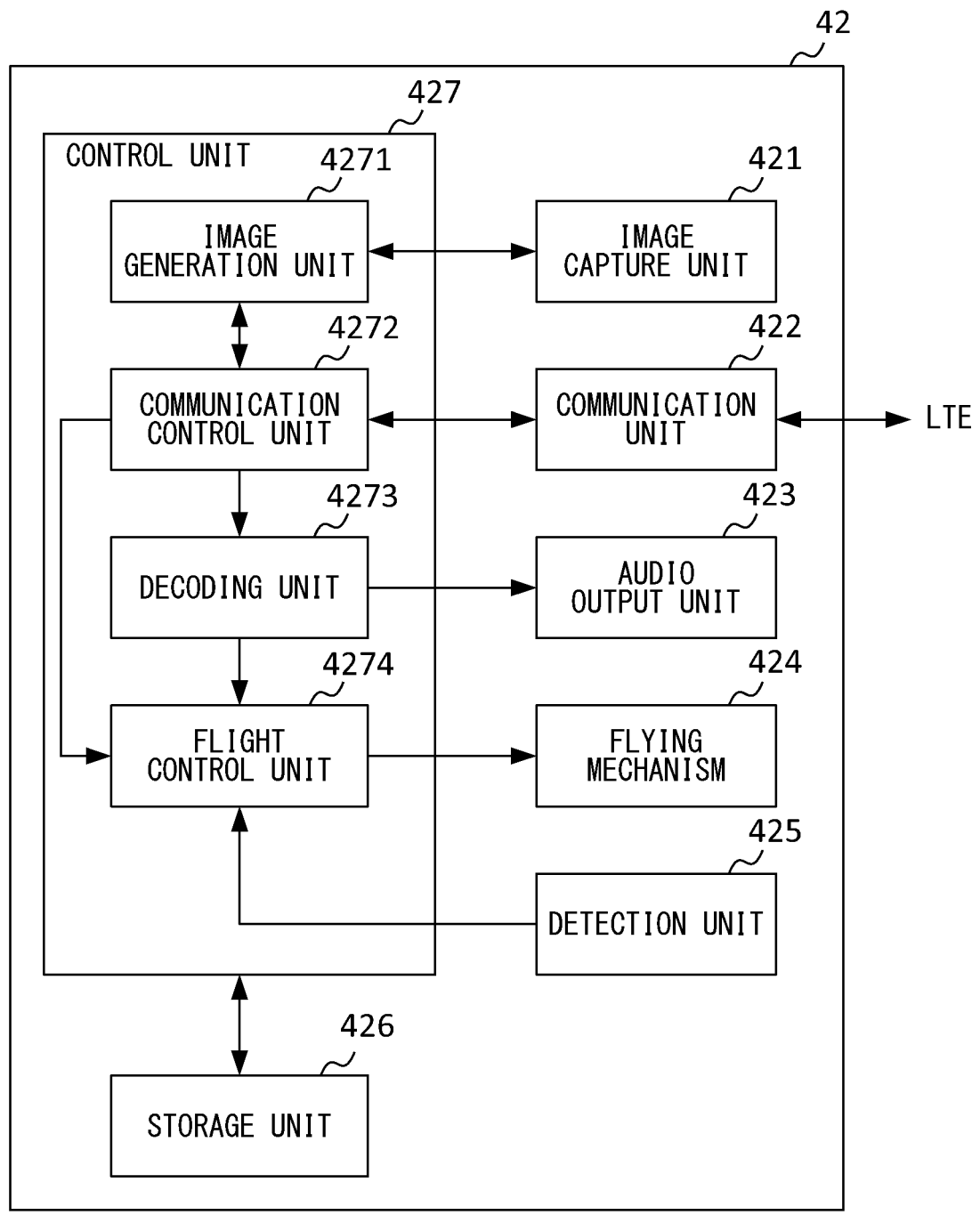
FIG. 19 is a diagram showing the structure of a flying device according to the seventh embodiment.

FIG. 19 is a diagram showing the structure of the flying device 42 according to the seventh embodiment. The flying device 42 has an image capture unit 421, a communication unit 422, an audio output unit 423, a flying mechanism 424, a detection unit 425, a storage unit 426 and a control unit 427. The control unit 427 has an image generation unit 4271, a communication control unit 4272, a decoding unit 4273 and a flight control unit 4274.

The image capture unit 421 is, for example, a camera that captures images of the vicinity of the flight position of the flying device 42 and generates captured image data. The image capture unit 421 transmits the generated captured image data to the image generation unit 4271. The communication unit 422 is a communication module that transmits and receives radio signals for communicating over a wireless communication channel, and has a function similar to that of the communication unit 412.

When audio data in a frequency band within the audible range is received by the communication control unit 4272, the audio output unit 423 outputs audio based on said audio data. The audio output unit 423 specifically outputs audio based on audio data obtained by decoding, by the decoding unit 4273, encoded audio data that is obtained by encoding as the audio data in a frequency band within the audible range received by the communication control unit 4272. The audio output unit 423 includes, for example, a speaker.

The flying mechanism 424 includes propellers, motors for rotating the propellers, rudders and the like. The flying mechanism 424 can change the flight speed and the flight direction by making these mechanisms operate on the basis of control by the flight control unit 4274.

The detection unit 425 includes, for example, a wind direction/speed meter, an acceleration sensor and a GPS (Global Positioning System) receiver, and outputs machine information for determining the state of the flying device 42, such as the flight speed, the tilt and the flight position of the flying device 42, to the flight control unit 4274.

The storage unit 426 is a storage medium including a ROM, a RAM or the like. The storage unit 426 stores programs that are executed by the control unit 427. Additionally, the storage unit 426 is used as a work memory for the control unit 427, and for example, temporarily stores control information or instruction information received from the control device 41.

The control unit 427 is, for example, a CPU. The control unit 427 executes the programs stored in the storage unit 426 and thereby functions as the image generation unit 4271, the communication control unit 4272, the decoding unit 4273 and the flight control unit 4274.

The image generation unit 4271 controls the image capture unit 421 to capture images of the vicinity of the flight position and generate captured image data. The image generation unit 4271 transmits the generated captured image data to the communication control unit 4272.

The communication control unit 4272 responds to calls to the telephone number corresponding to the flying device made from the control device 41 for controlling the flying device to a base station of the mobile telephone network, and after a voice communication session with the control device 41 has been established, receives control information via the voice communication session. Additionally, the communication control unit 4272 receives a transmission destination address corresponding to the control device 41 via the mobile telephone network base station 43B, and after a data communication session with the control device 41 corresponding to the transmission destination address has been established, receives instruction information including instructions to the flying device, different from the control information, via the data communication session. The communication control unit 4272 receives instruction information providing instructions, for example, to capture images. The communication control unit 4272 transmits the received control information to the flight control unit 4274. The communication control unit 4272 transmits the received instruction information to the image generation unit 4271.

Specifically, the communication control unit 4272 receives, via the mobile telephone network base station 43B, from an IPDB that manages telephone numbers and IP addresses associated with the telephone numbers, an IP address associated with the telephone number corresponding to the control device 41 (hereinafter referred to as the IP address of the control device 41). The communication control unit 4272 starts a peer-to-peer (P2P) data communication session using the received IP address of the control device 41. The communication control unit 4272 receives instruction information including instructions to the flying device different from the control information via the P2P data communication session.

The communication control unit 4272 receives instruction information, for example, providing instructions to capture images. The communication control unit 4272 transmits the received control information to the flight control unit 4274. The communication control unit 4272 transmits the received instruction information to the image generation unit 4271.

The communication control unit 4272 transmits machine information of the flying device to the control device 41 via the voice communication session. Additionally, the communication control unit 4272 transmits captured image data to the control device 41 via the data communication session. Thus, the communication control unit 4272 of the flying device 42 transmits machine information necessary for controlling the flying device to the control device 41 via a low-delay voice communication session, and transmits captured image data including a large amount of data to the control device 41 via a data communication session. For this reason, a user can capture images of the vicinity of the flight position of the flying device 42 while controlling the flying device 42 from a remote location.

The decoding unit 4273 decodes control information that has been encoded into audio data in a frequency band outside the audible range, received by the communication control unit 4272 via the voice communication session. The decoding unit 4273 transmits the decoded control information to the flight control unit 4274. The flight control unit 4274 controls the flight state on the basis of the control information received by the communication control unit 4272. Additionally, the flight control unit 4274 controls the flight state on the basis of the control information after it has been decoded by the decoding unit 4273.

[Action Sequence in Flight Control System S]

Figure 20:
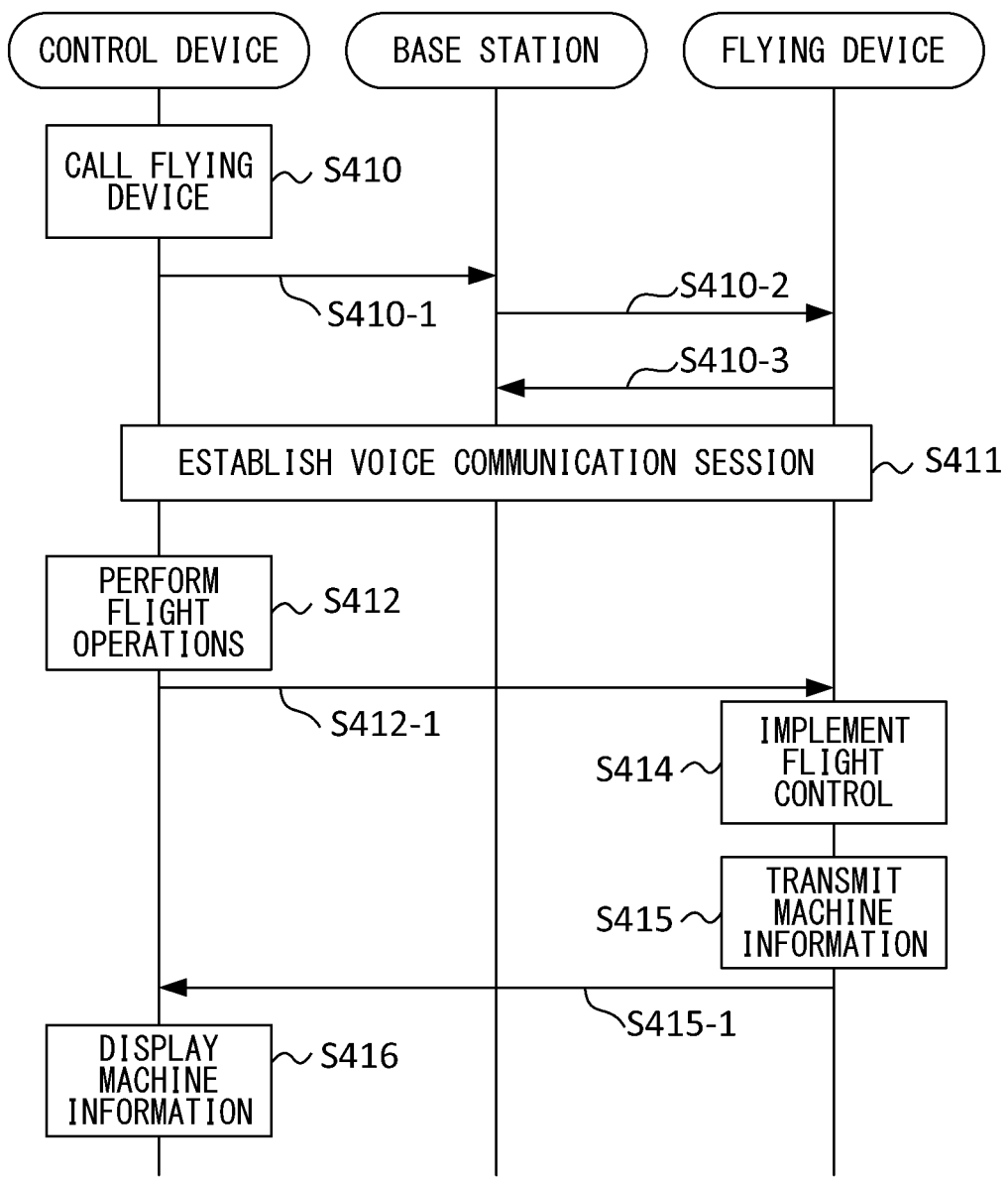
FIG. 20 is a diagram showing an example of an action sequence in the flight control system according to the seventh embodiment.

FIG. 20 is a diagram showing an example of an action sequence in the flight control system S according to the seventh embodiment. While referring to FIG. 17, the actions of the flight control system S will be explained using the action sequence in FIG. 20. First, the communication control unit 4162 in the control device 41 transmits a call signal to the mobile telephone network base station 43A using the telephone number corresponding to the flying device 42 (S410). Upon receiving the call signal transmitted from the control device 41, the base station 43A transmits a call signal to the corresponding telephone number (S410-1). Upon receiving the call signal from the base station 43B (S410-2), the flying device 42 transmits a response signal to the base station 43B (S410-3). The flying device 42 stores, in the storage unit 426, telephone numbers corresponding to control devices 41 from which control information will be accepted, and if a call from a telephone number corresponding to a control device 41 that is not stored has been received, then a response signal is not transmitted, or a response denial signal is transmitted.

When the base station 43B receives a response signal from the flying device 42, a session construction server in the mobile telephone network sets a logical packet transmission path for the voice communication session between the control device 41 and the flying device 42 (S411). Thus, the session construction server sets a logical packet transmission path for the voice communication session, thereby establishing a voice communication session that is bandwidth-guaranteed and that has a delay tolerance value of 100 ms between the control device 41 and the flying device 42. Thereafter, the control device 41 and the flying device 42 transmit and receive control information via the established voice communication session.

Next, the user operates the operation unit 413 of the control device 41 to perform flight operations (S412). The communication control unit 4162 transmits control information acquired by the control information acquisition unit 4163 via the voice communication session (S412-1). The communication control unit 4272 of the flying device 42 receives control information via the voice communication session. The flight control unit 4274 controls the flight state on the basis of control information received by the communication control unit 4272 (S414). The communication control unit 4272 transmits machine information to the control device 41 via the voice communication session (S415). The communication control unit 4162 of the control device 41 transmits, to the display control unit 4161, machine information received from the flying device 42 via the voice communication session (S415-1). The display control unit 4161 controls the display unit 411 so as to display the received machine information (S416).

Modified Example 1

In the description above, the communication control unit 4272 of the flying device 42 transmitted the machine information via a voice communication session. However, there is no limitation thereto, and it is possible to arrange the flight control system S so that the flying device 42 can transmit the machine information and the captured image data via the data communication session after a data communication session has been established between the control device 41 and the flying device 42.

Figure 21:
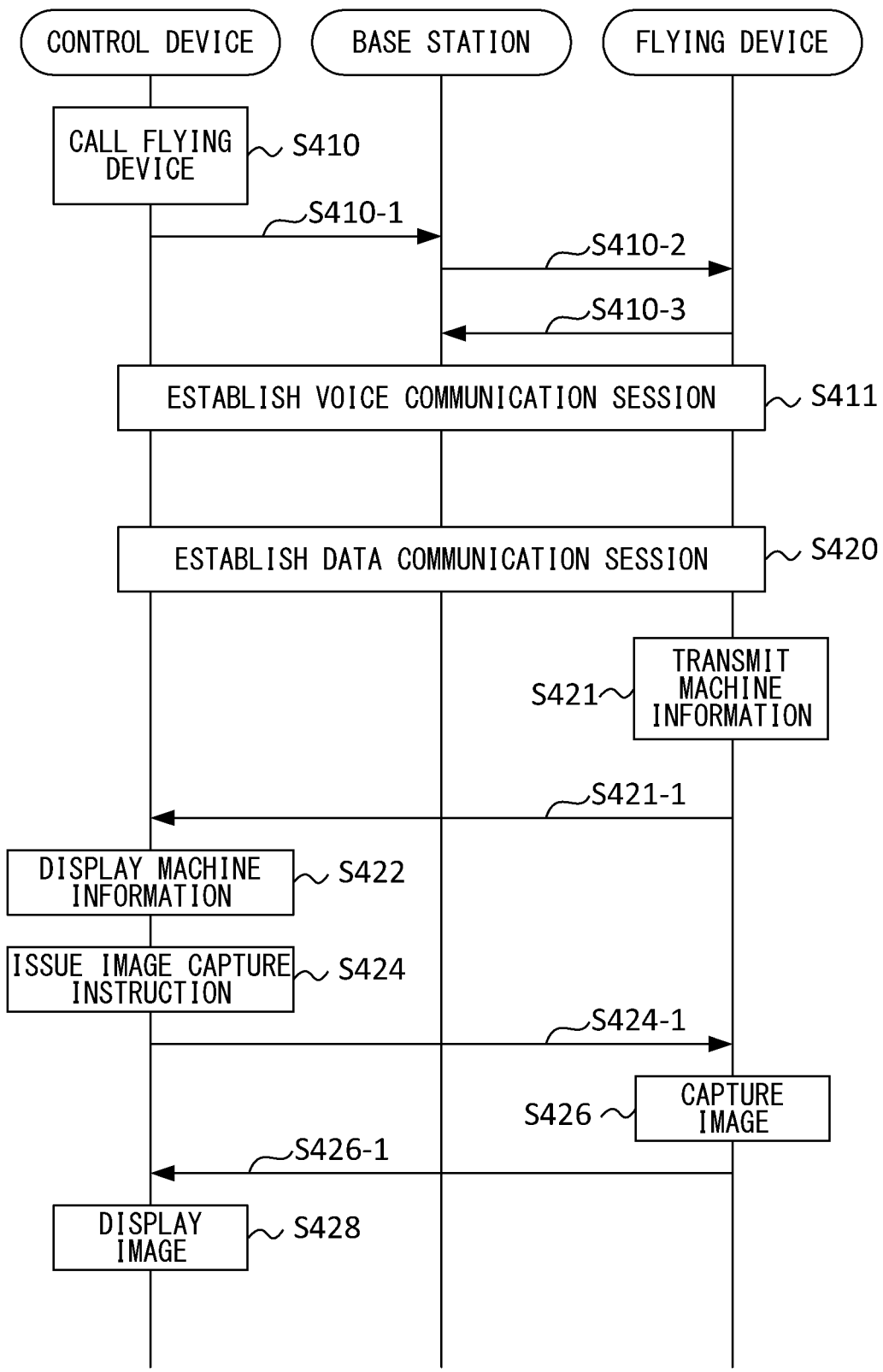
FIG. 21 is a diagram showing an action sequence in modified example 1 in the flight control system according to the seventh embodiment.

FIG. 21 is a diagram showing the action sequence in modified example 1 in the flight control system S according to the seventh embodiment. First, when the base station 43B receives a response signal from the flying device 42 responding to the call signal transmitted from the control device 41, the session construction server in the mobile telephone network sets a logical packet transmission path for a voice communication session between the control device 41 and the flying device 42 (S411). Next, the communication control unit 4162 of the control device 41 and the communication control unit 4272 of the flying device 42 start a P2P data communication session on the basis of their respective IP addresses (S420). When the data communication session has been established, the flying device 42 transmits the machine information (S421). The display control unit 4161 of the control device 41 makes the display unit 411 display display data based on the machine information received from the flying device 42 via the data communication session (S421-1, S422).

The user operates the control device 41 so as to capture images of the vicinity of the flying device 42 (S424). The control information acquisition unit 4163 acquires, from the operation unit 413, instruction information including instructions to cause the flying device 42 to capture images. The communication control unit 4162 transmits instruction information to the flying device 42 via the data communication session (S424-1). The communication control unit 4272 of the flying device 42 receives instruction information including instructions to capture images via the data communication session. The image generation unit 4271 generates captured image data on the basis of the instruction information. The communication control unit 4272 transmits captured image data generated by the image generation unit 4271 to the control device 41 via the data communication session (S426).

The communication control unit 4272 of the control device 41 receives captured image data via the data communication session (S426-1). The display control unit 4161 makes the display unit 411 display display data based on the captured image data received from the flying device 42 via the data communication session (S428).

Modified Example 2

In the description above, the control device 41 transmitted encoded control information to the flying device 42 without distinguishing whether the control information was encoded as data in a frequency band within the audible range or data in a frequency band outside the audible range. However, there is no limitation thereto, and by encoding control information as data in a frequency band outside the audible range and encoding audio data as data in a frequency band within the audible range, the control device 41 can simultaneously transmit control information and the voice of the user.

Figure 22:
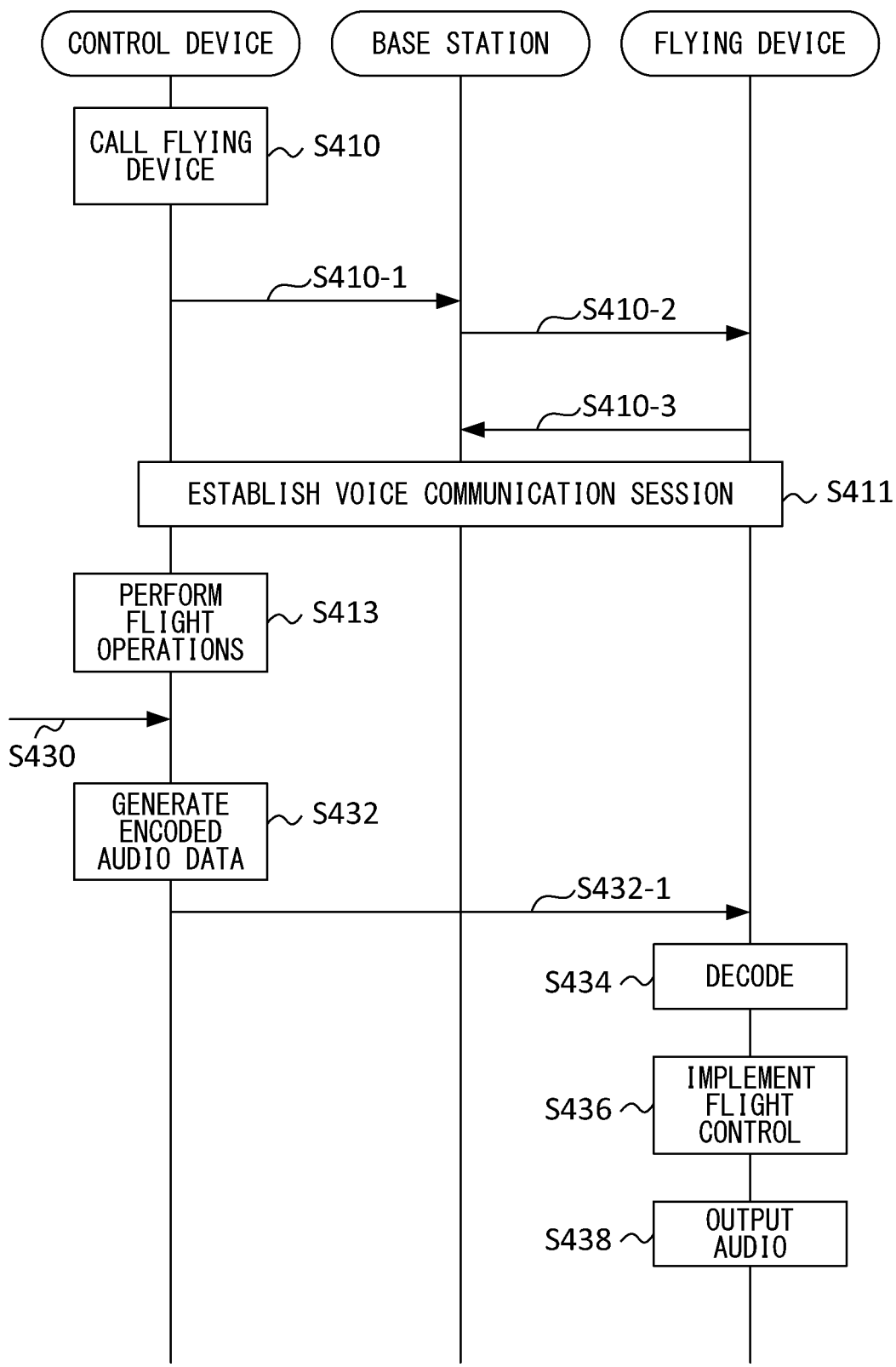
FIG. 22 is a diagram showing an action sequence in modified example 2 in the flight control system according to the seventh embodiment.

FIG. 22 is a diagram showing the action sequence in modified example 2 in the flight control system S according to the seventh embodiment. The actions from S410 to S411 in FIG. 22 are similar to those in the above description and will therefore be omitted. The control information acquisition unit 4163 of the control device 41 transmits acquired control information to the encoded data generation unit 4164 (S413). Next, the user of the control device 41 inputs audio to the control device 41 (S430). The audio acquisition unit 414 in the control device 41 transmits the acquired audio to the encoded data generation unit 4164. The encoded data generation unit 4164 generates encoded control data by encoding the received control information as audio data in a frequency band outside the audible range. Additionally, the encoded data generation unit 4164 generates encoded audio data by encoding the received audio as audio data in a frequency band within the audible range (S432). The communication control unit 4162 transmits the encoded control data and the encoded audio data to the flying device 42 via a voice communication session (S432-1).

Upon receiving the encoded control data and the encoded audio data via the voice communication session, the communication control unit 4272 in the flying device 42 transmits the encoded control data and the encoded audio data to the decoding unit 4273. The decoding unit 4273 decodes the encoded control data and the encoded audio data (S434). The decoding unit 4273 transmits the control information obtained by decoding the encoded control data to the flight control unit 4274. The flight control unit 4274 controls the flight state on the basis of the decoded control information (S436). The decoding unit 4273 transmits audio data obtained by decoding the encoded audio data to the audio output unit 423. The audio output unit 423 outputs audio on the basis of the decoded audio data (S438).

Modified Example 3

In the description above, the control device 41 and the flying device 42 transmitted and received control data via a voice communication session, but the communication control unit 4162 of the control device 41 may transmit the control information by appending identification information indicating that the control information is audio data thereto. In this case, the communication control unit 4162 transmits, to the base station 43A, the control information having the identification information indicating that the control information is audio data appended thereto. Upon receiving the control information having the identification indicating that the control information is audio data appended thereto, the base station 43A transfers the control information to the flying device 42 via a transmission path for audio data communication that is bandwidth-guaranteed. The flying device 42 receives control information via a transmission path for audio data communications.

When the user controls the flying device 42 from a position that cannot be directly reached by radio signals for controlling the flying device 42 generated by the control device 41, the control device 41 exchanges various types of control information with the flying device 42 via a public communication network. However, on the public communication network, a large amount of data transmitted from various communication terminals is exchanged. For this reason, there are cases in which the transmission of control data is delayed during hours of the day in which there is heavy traffic. When the transmission of control information for controlling the flying device 42 is delayed, there are cases in which it becomes difficult to implement quick control in response to the state of the flying device 42, thereby lowering the flight performance of the flying device.

As described above, in the flight control system S according to the seventh embodiment, the control device 41 can transmit control information to the flying device 42 via a voice communication session. Thus, the flying device 42 can transmit machine information via a voice communication session or a data communication session. Therefore, the control device 41 can quickly control the flying device 42 without lowering the flight performance, even during hours of the day in which there is heavy traffic.

Multiple embodiments have been explained above. New embodiments obtained by combining any of these embodiments are also included as embodiments of the present invention. The new embodiments obtained by combination provide advantageous effects combining the advantageous effects of the respective embodiments. As a result thereof, it is possible to more efficiently suppress transmission delays of data transmitted and received between the flying device 42 and the control device 41.

While the present invention has been explained by referring to multiple embodiments above, the technical scope of the present invention is not limited to the scope that is described for the above-mentioned embodiments. It will be clear to a person skilled in the art that various modifications and improvements may be made to the above-mentioned embodiments. In particular, specific embodiments by which devices are distributed and integrated are not limited to those illustrated above, and they may be fully or partially configured in a functionally or physically distributed or integrated manner in arbitrary units in accordance with various additions or in accordance with the functional load.

INDUSTRIAL APPLICABILITY

The present invention provides the advantageous effect that transmission delays of data transmitted and received between a flying device and a control device can be reduced.

REFERENCE SIGNS LIST

11 Control device
12 Flying device
13 Base station
111 Display unit
112 Operation unit
113 Communication unit
115 Storage unit
116 Control unit
121 Camera
122 Detection unit
123 Communication unit
125 Flying mechanism
126 Storage unit
127 Control unit
1131 First communication unit
1132 Second communication unit
1161 Display control unit
1162 Operation receiving unit
1163 Control information generation unit
1164 Transmission control unit
1165 Reception control unit
1231 First communication unit
1232 Second communication unit
1271 Data generation unit
1272 Reception control unit
1273 Flight control unit
1274 Acquisition unit
1275 Determination unit
1276 Transmission control unit
21 Flying device
22 Control device
23 Base station
211 Detection unit
212 Camera
213 Communication unit
214 Flying mechanism
215 Storage unit
216 Control unit
2131 First communication unit
2132 Second communication unit
2161 Reception control unit
2162 Flight control unit
2163 Text data generation unit
2164 Captured image data generation unit
2165 Transmission control unit
31 Control device
32 Base station
33 Flight control device
34 Flying device
35 Information communication terminal
311 Communication unit
312 Storage unit
313 Control unit
3131 Determination unit
3132 Priority level control unit
41 Control device
42 Flying device
43 Base station
411 Display unit
412 Communication unit
413 Operation unit
414 Audio acquisition unit
415 Storage unit
416 Control unit
421 Image capture unit
422 Communication unit
423 Audio output unit
424 Flying mechanism
425 Detection unit
426 Storage unit
427 Control unit
4161 Display control unit
4162 Communication control unit
4163 Control information acquisition unit
4164 Encoded data generation unit
4271 Image generation unit
4272 Communication control unit
4273 Decoding unit
4274 Flight control unit

The invention claimed is:

1. A control device comprising:
   a reception unit configured to receive, from a communication terminal, via a base station in a mobile telephone network, a usage request for a wireless communication channel on the mobile telephone network;
   a determination unit configured to, on the basis of terminal information contained in the usage request received by the reception unit, determine a terminal type of the communication terminal and a data type of data transmitted by the communication terminal; and a priority level control unit configured to
make a priority level for allocation of wireless resources higher than the priority level of a case where a first condition is not satisfied when the first condition is satisfied, wherein the first condition represents that the terminal type determined by the determination unit is a flying device and the data type is flight data indicating a flight state of the flying device, or
make the priority level for allocation of the wireless resources higher than the priority level of a case where a second condition is not satisfied when the second condition is satisfied, wherein the second condition represents that the terminal type of the communication terminal is a flight control device for controlling the flying device and the data type is control data for controlling the flying device,
wherein the priority level control unit acquires electric field strength information indicating an electric field strength in a vicinity of the flying device, and further determines the priority level for allocation of the wireless resources on the basis of the electric field strength information, when the first condition is satisfied.

2. The control device as claimed in claim 1, wherein:
the reception unit receives the electric field strength information; and
the priority level control unit determines the priority level on the basis of the received electric field strength information.

3. The control device as claimed in claim 1, wherein:
the reception unit receives position information indicating a flight position of the flying device; and
the priority level control unit determines the electric field strength information for the vicinity of the flying device on the basis of the flight position indicated by the position information and the electric field strength distribution information indicating a distribution of the electric field strength in accordance with position and altitude, and determines the priority level on the basis of the determined electric field strength information.

4. The control device as claimed in claim 3, wherein:
the priority level control unit determines the priority level on the basis of the electric field strength information on a scheduled flight path that is determined on the basis of the electric field strength distribution information and the scheduled flight path of the flying device.

5. The control device as claimed in claim 3, wherein:
the priority level control unit estimates a scheduled flight path of the flying device on the basis of the flight position and a flight speed of the flying device, and determines the priority level on the basis of the electric field strength information on the scheduled flight path that is determined on the basis of the electric field strength distribution information and the scheduled flight path that was estimated.

6. The control device as claimed in claim 4, wherein:
the priority level control unit outputs, to the base station including the scheduled flight path in a communication area thereof, an instruction to allocate the wireless resources to the flying device on the basis of the priority level.

7. The control device as claimed in claim 5, wherein:
the priority level control unit outputs, to the base station including the scheduled flight path in a communication area thereof, an instruction to allocate the wireless resources to the flying device on the basis of the priority level.

8. The control device as claimed in claim 1, wherein:
the priority level control unit acquires attributes, including at least one of a name of a company managing the flying device or a flight purpose of the flying device, of the flying device and further determines the priority level for allocation of the wireless resources on the basis of the acquired attributes, when the first condition is satisfied.

9. The control device as claimed in claim 1, wherein:
the priority level control unit further determines the priority level for allocation of the wireless resources on the basis of a type of application software used by the flying device, when the first condition is satisfied.

10. The control device as claimed in claim 1, wherein:
the priority level control unit further determines the priority level for allocation of the wireless resources on the basis of a flight speed of the flying device, when the first condition is satisfied.

11. A control method comprising:
receiving, from a communication terminal, via a base station in a mobile telephone network, a usage request for a wireless communication channel on the mobile telephone network;
determining, on the basis of terminal information contained in the received usage request, a terminal type of the communication terminal and a data type of data transmitted by the communication terminal; and
making a priority level for allocation of wireless resources higher than the priority level of a case where a first condition is not satisfied when the first condition is satisfied, wherein the first condition represents that the determined terminal type is a flying device and the data type is flight data indicating a flight state of the flying device, or
making the priority level for allocation of the wireless resources higher than the priority level of a case where a second condition is not satisfied when the second condition is satisfied, wherein the second condition represents that the terminal type of the communication terminal is a flight control device for controlling the flying device and the data type is control data for controlling the flying device,
wherein the making of the priority level includes acquiring electric field strength information indicating an electric field strength in a vicinity of the flying device, and further determining the priority level for allocation of the wireless resources on the basis of the electric field strength information, when the first condition is satisfied.

12. The control method as claimed in claim 11, wherein
the receiving includes receiving the electric field strength information, and
in the determining, the priority level is determined on the basis of the received electric field strength information.

13. The control method as claimed in claim 11, wherein
the receiving includes receiving position information indicating a flight position of the flying device,
the acquiring includes determining the electric field strength information for the vicinity of the flying device on the basis of the flight position indicated by the position information and the electric field strength distribution information indicating a distribution of the electric field strength in accordance with position and altitude, and
in the determining, the priority level is determined on the basis of the determined electric field strength information.

14. The control method as claimed in claim 13, wherein
in the determining, the priority level is determined on the basis of the electric field strength information on a scheduled flight path that is determined on the basis of the electric field strength distribution information and the scheduled flight path of the flying device.

15. The control method as claimed in claim 13, wherein the making of the priority level includes estimating a scheduled flight path of the flying device on the basis of the flight position and a flight speed of the flying device, and
in the determining, the priority level is determined on the basis of the electric field strength information on the scheduled flight path that is determined on the basis of the electric field strength distribution information and the scheduled flight path that was estimated.

16. The control method as claimed in claim 14, wherein the making of the priority level includes outputting, to the base station including the scheduled flight path in a communication area thereof, an instruction to allocate the wireless resources to the flying device on the basis of the priority level.

17. The control method as claimed in claim 15, wherein the making of the priority level includes outputting, to the base station including the scheduled flight path in a communication area thereof, an instruction to allocate the wireless resources to the flying device on the basis of the priority level.

18. The control method as claimed in claim 11, wherein the making of the priority level includes acquiring attributes, including at least one of a name of a company managing the flying device or a flight purpose of the flying device, of the flying device and further determining the priority level for allocation of the wireless resources on the basis of the acquired attributes, when the first condition is satisfied.

19. The control method as claimed in claim 11, wherein the making of the priority level includes further determining the priority level for allocation of the wireless resources on the basis of a type of application software used by the flying device, when the first condition is satisfied.

20. The control method as claimed in claim 11, wherein the making of the priority level includes further determining the priority level for allocation of the wireless resources on the basis of a flight speed of the flying device, when the first condition is satisfied.

* * * * *